(12) United States Patent
Lai

(10) Patent No.: US 11,885,458 B2
(45) Date of Patent: Jan. 30, 2024

(54) CALIBRATION SYSTEM AND CALIBRATION BRACKET THEREFOR

(71) Applicant: AUTEL INTELLIGENT TECHNOLOGY CORP., LTD., Guangdong (CN)

(72) Inventor: Biwang Lai, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 75 days.

(21) Appl. No.: 17/445,538

(22) Filed: Aug. 20, 2021

(65) Prior Publication Data
US 2021/0381638 A1 Dec. 9, 2021

Related U.S. Application Data

(63) Continuation of application No. PCT/CN2020/073855, filed on Jan. 22, 2020.

(30) Foreign Application Priority Data

Mar. 20, 2019 (CN) .......................... 201910214915.5

(51) Int. Cl.
*F16M 11/04* (2006.01)
*G01S 7/02* (2006.01)
(Continued)

(52) U.S. Cl.
CPC ......... *F16M 11/045* (2013.01); *F16M 11/046* (2013.01); *F16M 11/18* (2013.01);
(Continued)

(58) Field of Classification Search
CPC .... F16M 11/045; F16M 11/046; F16M 11/18; F16M 11/26; F16M 11/28; G01S 7/027;
(Continued)

(56) References Cited

U.S. PATENT DOCUMENTS

| | | | |
|---|---|---|---|
| 678,642 A * | 7/1901 | Chambers ................ | A61B 3/18 248/405 |
| 759,189 A * | 5/1904 | Parsons .................... | A47C 3/30 248/404 |

(Continued)

FOREIGN PATENT DOCUMENTS

| | | |
|---|---|---|
| CN | 206830588 U | 1/2018 |
| CN | 108316744 A | 7/2018 |
| CN | 208520987 U | 2/2019 |

OTHER PUBLICATIONS

The extended European search report dated Nov. 11, 2022

*Primary Examiner* — Christopher Garft

(57) ABSTRACT

A calibration system and a calibration bracket are provided. The calibration bracket includes a base, a stand assembly and a support assembly. One end of a fixed vertical rod is mounted to the base, and a movable vertical rod is mounted to another end of the fixed vertical rod. The support assembly is mounted to the movable vertical rod. A driving mechanism includes a first threaded rotating member, a second threaded rotating member and a threaded fixed member. The first threaded rotating member is mounted to the fixed vertical rod. The second threaded rotating member includes a first threaded structure and a second threaded structure. The second threaded rotating member is mounted to the first threaded rotating member through the first threaded structure and is mounted to the threaded fixed member through the second threaded structure. The threaded fixed member is fixedly mounted to the movable vertical rod.

20 Claims, 22 Drawing Sheets

(51) Int. Cl.
  *F16M 11/18* (2006.01)
  *G01S 7/40* (2006.01)
  *F16M 11/26* (2006.01)
(52) U.S. Cl.
  CPC ............. *F16M 11/26* (2013.01); *G01S 7/027* (2021.05); *G01S 7/40* (2013.01)
(58) Field of Classification Search
  CPC ......... E04H 12/18; E04H 12/182; A47B 9/00; A47B 9/20; A47B 9/04; A47C 3/24; E04G 12/182
  USPC .......................................................... 248/405
  See application file for complete search history.

(56) References Cited

U.S. PATENT DOCUMENTS

| | | | | |
|---|---|---|---|---|
| 4,523,256 A * | 6/1985 | Small | .................... | G03B 15/02 362/11 |
| 6,076,787 A * | 6/2000 | Troyer | .................... | F16M 13/00 248/460 |
| 6,131,870 A * | 10/2000 | Tseng | ....................... | A47B 9/04 248/405 |
| 6,761,387 B2 * | 7/2004 | Sloss | ......................... | B60P 1/02 296/26.05 |
| 8,096,338 B2 * | 1/2012 | Postill | ................. | B29C 63/0004 156/598 |
| 10,385,603 B2 * | 8/2019 | Fletcher | ................. | E05F 11/405 |
| 2002/0043597 A1 * | 4/2002 | Forsberg | .................. | A47B 9/20 248/156 |
| 2006/0279143 A1 * | 12/2006 | Platz | ........................ | A47B 9/04 310/51 |
| 2011/0073247 A1 * | 3/2011 | Postill | ..................... | B29C 63/02 156/60 |
| 2017/0051869 A1 * | 2/2017 | Hsiao | ..................... | F16M 11/18 |
| 2019/0064320 A1 * | 2/2019 | Zack | ......................... | G01S 7/40 |
| 2020/0074675 A1 * | 3/2020 | Cejka | ..................... | F16M 11/42 |

\* cited by examiner

CALIBRATION SYSTEM AND CALIBRATION BRACKET THEREFOR

CROSS-REFERENCE TO RELATED APPLICATIONS

This application is a continuation application of International Application No. PCT/CN2020/073855, filed on Jan. 22, 2020, which claims priority of Chinese Patent Application No. 201910214915.5, filed on Mar. 20, 2019, which is incorporated herein by reference in its entirety.

TECHNICAL FILED

The present application relates to the technical field of vehicle maintenance and device calibration, and in particular, to a calibration system and a calibration bracket thereof.

BACKGROUND

An advanced driver assistant system (ADAS for short) is an active security technology of collecting environmental data inside and outside a vehicle at the prime time by using various sensors mounted to the vehicle to perform technical processing such as identification, detection, and tracking of static and dynamic objects. This causes a driver to perceive a potential danger as quickly as possible, thereby attracting attention and improving security. Sensors adopted in the ADAS mainly include a camera, a radar, a laser, and an ultrasonic wave. Light, heat, pressure, or other variables for monitoring status of a vehicle can be detected. The sensors are generally located on front and rear bumpers, on a side mirror, inside a steering column, or on a windscreen of the vehicle. During use of the vehicle, vibration, collision, environmental temperature and humidity, and the like change physical mounting states of the foregoing sensors. Therefore, correction or calibration needs to be carried out from time to time.

During correction or calibration of the foregoing sensors, calibration elements are usually hung on the calibration bracket to correct or calibrate the sensors on the vehicle. However, most of current calibration brackets have relatively large volumes and are complicated to assemble and difficult to move.

SUMMARY OF THE DISCLOSURE

Embodiments of the disclosure are intended to provide a calibration system and a calibration bracket thereof, which can resolve the technical problem in the prior art that a calibration bracket has relatively large volumes and is difficult to move.

The embodiments of the disclosure adopt the following technical solution to resolve the technical problem.

According to one aspect, a calibration bracket is provided, including a base, a stand assembly and a support assembly, the support assembly being configured to mount a calibration element, the stand assembly including: a fixed vertical rod, one end of the fixed vertical rod being mounted to the base; a movable vertical rod mounted to an other end of the fixed vertical rod, the movable vertical rod being movable relative to the fixed vertical rod only along a central axis, and the support assembly being mounted to the movable vertical rod; a driving mechanism, including a first threaded rotating member, a second threaded rotating member and a threaded fixed member, the first threaded rotating member being mounted to the fixed vertical rod and being rotatable relative to the fixed vertical rod only about the central axis, the second threaded rotating member having a first threaded structure and a second threaded structure spiraling about the central axis, a spiraling direction of the first threaded structure being the same as a spiraling direction of the second threaded structure, the second threaded rotating member being mounted to the first threaded rotating member through the first threaded structure and being mounted to the threaded fixed member through the second threaded structure, and the threaded fixed member being fixedly mounted to the movable vertical rod.

In some embodiments, the first threaded rotating member is inserted in the second threaded rotating member. The first threaded structure is disposed in the second threaded rotating member.

In some embodiments, the first threaded rotating member includes a first screw portion and a first limiting portion, the first limiting portion being disposed at an end of the first screw portion. The second threaded rotating member has a first screw hole and a first accommodating groove, the first screw hole being in communication with the first accommodating groove. The first threaded structure is disposed on a hole wall of the first screw hole. The first screw portion is inserted in the first screw hole. The first limiting portion is accommodated in the first accommodating groove. A cross-sectional dimension of the first limiting portion is greater than a cross-sectional dimension of the first screw portion.

In some embodiments, the second threaded rotating member is inserted in the first threaded rotating member. The first threaded structure is disposed outside the second threaded rotating member.

In some embodiments, the second threaded rotating member is inserted in the threaded fixed member. The second threaded structure is disposed outside the second threaded rotating member.

In some embodiments, the second threaded rotating member includes a second screw portion and a second limiting portion. The second limiting portion is disposed at an end of the second screw portion. The threaded fixed member has a second screw hole and a second accommodating groove. The second screw hole is in communication with the second accommodating groove. The second threaded structure is disposed on a hole wall of the second screw hole. The second screw portion is inserted in the second screw hole. The second limiting portion is accommodated in the second accommodating groove. A cross-sectional dimension of the second limiting portion is greater than a cross-sectional dimension of the second screw portion.

In some embodiments, the threaded fixed member is disposed in the second threaded rotating member. The second threaded structure is disposed in the second threaded rotating member.

In some embodiments, the driving mechanism further includes a hand wheel configured to drive the first threaded rotating member to rotate.

In some embodiments, the driving mechanism further includes a first helical gear and a second helical gear. The first helical gear is fixedly mounted to the first threaded rotating member. An axis of rotation of the first helical gear overlaps the central axis. The second helical gear is mounted to the fixed vertical rod. The second helical gear is rotatable relative to the fixed vertical rod about its axis of rotation. An axis of rotation of the second helical gear is perpendicular to the central axis. The first helical gear is meshed with the second helical gear.

In some embodiments, the fixed vertical rod has a mounting separator plate. The first threaded rotating member includes a journal portion. The journal portion is disposed at the end of the first screw portion. The journal portion is inserted in the mounting separator plate. The cross-sectional dimension of the first screw portion is greater than a cross-sectional dimension of the journal portion. The first threaded rotating member is rotatable relative to the fixed vertical rod only about the central axis.

In some embodiments, the movable vertical rod is inserted in the fixed vertical rod. The movable vertical rod is movable relative to the fixed vertical rod along the central axis.

In some embodiments, cross-sections of both the movable vertical rod and the fixed vertical rod are non-circular.

In some embodiments, the movable vertical rod includes an inner rod portion and an outer rod portion. The inner rod portion is inserted in the outer rod portion. The outer rod portion is inserted in the fixed vertical rod. The threaded fixed member is fixedly mounted to the inner rod portion.

In some embodiments, the outer rod portion has a second sliding groove and a second snap-fit opening. The second sliding groove is in communication with the second snap-fit opening. The inner rod portion has a second stop portion. A cross-sectional dimension of the inner rod portion is less than a cross-sectional dimension of the second stop portion. The second stop portion is inserted in the second sliding groove. The inner rod portion is inserted in the second snap-fit opening.

In some embodiments, the fixed vertical rod includes a fixed vertical rod body and a foldable vertical rod portion. One end of the fixed vertical rod body is mounted to the base. An other end of the fixed vertical rod body is mounted to the foldable vertical rod portion. The foldable vertical rod portion is pivotably rotatable relative to the fixed vertical rod body. The movable vertical rod is mounted to the foldable vertical rod portion and is movable relative to the foldable vertical rod portion along the central axis. The first threaded rotating member is mounted to the foldable vertical rod portion and is rotatable relative to the foldable vertical rod portion only about the central axis.

In some embodiments, the fixed vertical rod has a first sliding groove and a first snap-fit opening. The first sliding groove is in communication with the first snap-fit opening. The movable vertical rod has a first stop portion. A cross-sectional dimension of the movable vertical rod is less than a cross-sectional dimension of the first stop portion. The first stop portion is inserted in the first sliding groove. The movable vertical rod is inserted in the first snap-fit opening.

In some embodiments, the support assembly is mounted to a top of the movable vertical rod.

According to another aspect, a calibration system is provided, including a calibration element and the foregoing calibration bracket. The calibration element may be hung on the calibration bracket.

Compared with the prior art, in the calibration bracket of this embodiment, the first threaded rotating member, when rotating relative to the fixed vertical rod, can drive the second threaded rotating member, the threaded fixed member and the movable vertical rod to move toward the fixed vertical rod together. In this way, the volume of the calibration bracket is reduced, facilitating removal of the calibration bracket.

BRIEF DESCRIPTION OF THE DRAWINGS

One or more embodiments are exemplarily described with reference to the corresponding figures in the accompanying drawings. The descriptions are not to be construed as limiting the embodiments. Elements in the accompanying drawings that have same reference numerals are represented as similar elements. Unless otherwise particularly stated, the figures in the accompanying drawings are not drawn to scale.

DETAILED DESCRIPTION OF THE DISCLOSURE

For ease of understanding the disclosure, the disclosure is described in more detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. In the description of this specification, orientations or position relationships indicated by terms such as "up", "down", "inside", "outside", "vertical", and "horizontal" are based on orientations or position relationships shown in the accompanying drawings. The orientations or position relationships are merely used for ease of description of the disclosure and for brevity of description, rather than indicating or implying that the mentioned apparatus or element needs to have a particular orientation or needs to be constructed and operated in a particular orientation. Therefore, the orientations or position relationships should not be understood as a limitation on the disclosure. In addition, terms "first" and "second" are merely used for description and should not be understood as indicating or implying relative importance.

Unless otherwise defined, meanings of all technical and scientific terms used in the specification are the same as those usually understood by those skilled in the art of the disclosure. Terms used in the specification of the disclosure are merely intended to describe objectives of the specific embodiment, and are not intended to limit the disclosure. The term "and/or" used in this specification includes any or all combinations of one or more related listed items.

In addition, technical features involved in different embodiments of the disclosure described below may be combined together if there is no conflict.

Figure 1:
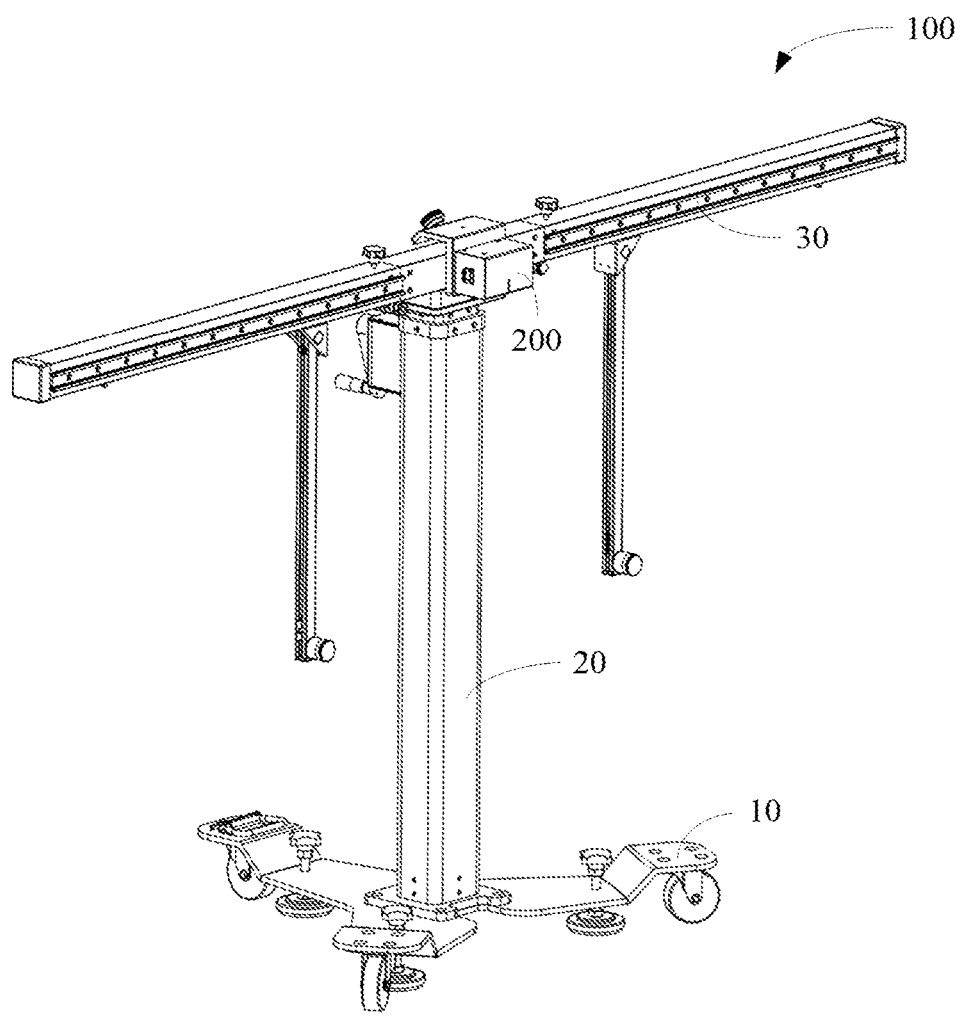
FIG. 1 is a three-dimensional view of a calibration bracket according to an embodiment of the disclosure, where a multi-line laser is hung on the calibration bracket.
Figure 2:
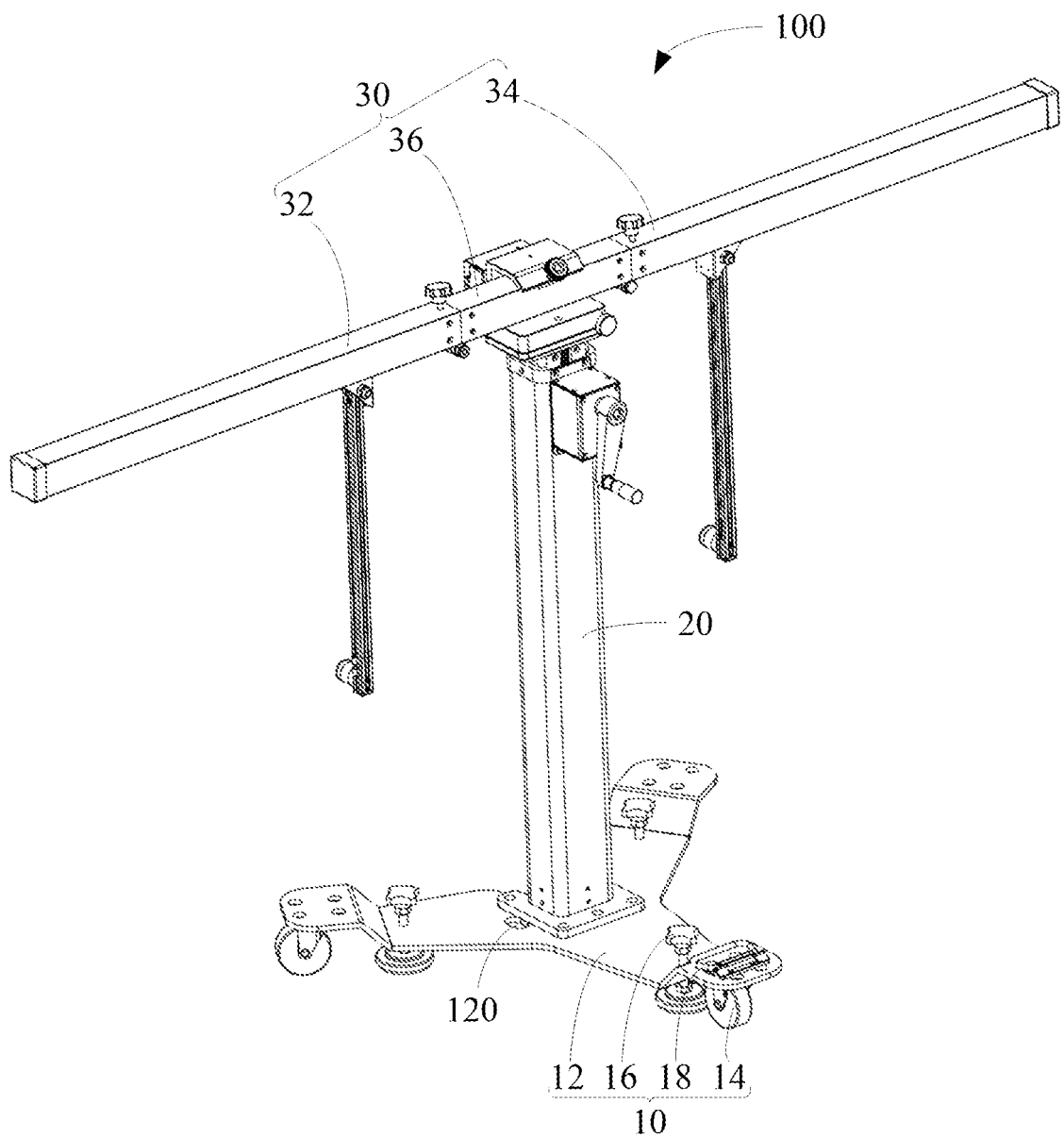
FIG. 2 is a three-dimensional view of the calibration bracket shown in FIG. 1 from another perspective.
Figure 3:
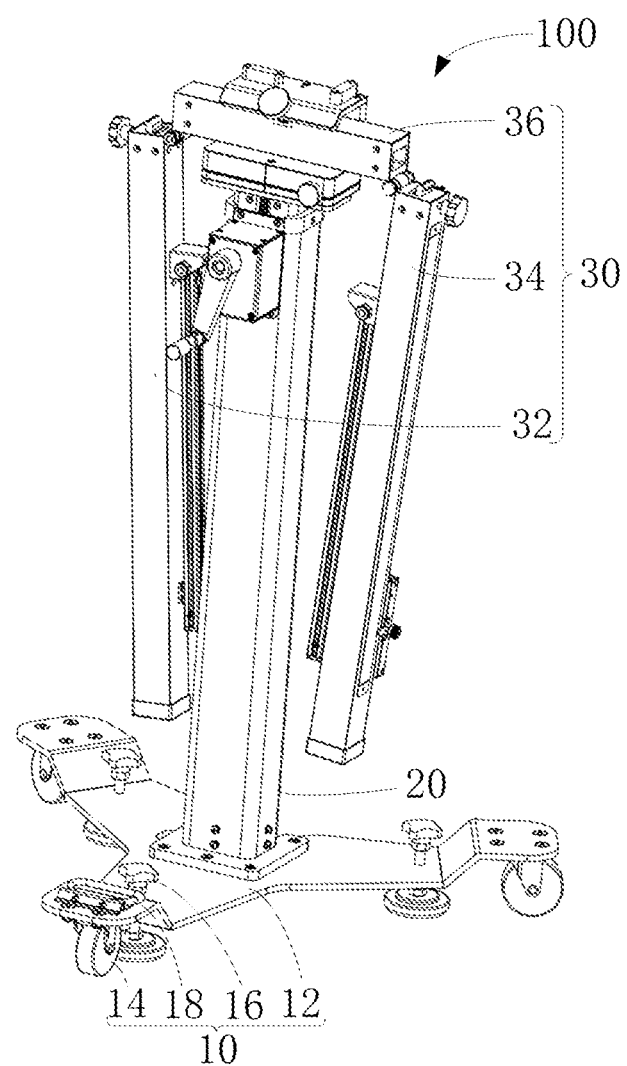
FIG. 3 is a three-dimensional view of the calibration bracket shown in FIG. 1, where a support assembly of the calibration bracket is in a folded state.

Referring to FIG. 1, FIG. 2 and FIG. 3 together, a calibration bracket 100 provided in an embodiment of the disclosure includes a base 10, a stand assembly 20 and a support assembly 30. The stand assembly 20 is fixedly connected to the base 10. The support assembly 30 includes a first beam portion 32, a second beam portion 34 and a connecting portion 36. The connecting portion 36 is mounted to the stand assembly 20. One end of the connecting portion 36 is hinged to the first beam portion 32. An other end of the connecting portion 36 is hinged to the second beam portion 34. The first beam portion 32 and the second beam portion 34 can respectively rotate toward each other relative to the connecting portion 36, to fold the support assembly 30. The first beam portion 32 and the second beam portion 34 can also respectively rotate away from each other relative to the connecting portion 36, to unfold the support assembly 30.

The "mounting" includes fixed mounting such as welding mounting as well as detachable mounting.

The support assembly 30 may be configured to hang a calibration element, for example, a multi-line laser 200, a calibration target, a radar reflection or absorption apparatus, and the like, to calibrate a vehicle-mounted driver assistant system.

In the calibration bracket 100 of this embodiment, the first beam portion 32 and the second beam portion 34 can pivotally rotate relative to the connecting portion 36, respectively, to fold the support assembly 30. In this way, the volume of the calibration bracket 100 can be reduced to facilitate shipment.

The first beam portion 32, the second beam portion 34 and the connecting portion 36 constitute a beam.

Optionally, the support assembly is mounted on the top surface of a movable vertical rod. In this way, a center of gravity of the support assembly is closer to a center of gravity of the vertical rod compared with a traditional calibration bracket. Stability of the calibration bracket can be improved and a base with a smaller area can be used.

Optionally, the first beam portion 32 and the second beam portion 34 can rotate toward each other relative to the connecting portion 36. For example, the first beam portion and the second beam portion can be folded together downward, upward, forward, and backward. Optionally, when the first beam portion 32 and the second beam portion 34 are folded downward, a length of the connecting portion 36 can be relatively short, and the first beam portion 32 and the second beam portion 34 are in a drooping state. In this way, the support assembly 30 does not need to be removed from the stand assembly 20. Space occupied by the calibration bracket 100 will be significantly reduced. Therefore, the calibration bracket can be carried conveniently in vehicles. When the first beam portion 32 and the second beam portion 34 are folded upward, forward and backward, a device for rotating the beam may be disposed. The first beam portion 32 and the second beam portion 34 are finally folded downward, or may be in a drooping state. Alternatively, the length of the connecting portion 36 can be made relatively long. The first beam portion 32 and the second beam portion 34 can be placed close to the connecting portion 36 after being folded and can be fixed to the connecting portion 36 by using a releasable fixing device. In the latter case, in order to further reduce the space occupied by the calibration bracket 100, the support assembly 30 may be removed from the stand assembly 20 and then mounted to the stand assembly 20 after being carried to a required place.

Those skilled in the art may understand that the manner of folding the support assembly 30 is not limited to the foregoing manners. For example, the beam may be folded into two sections, and there is no connecting portion 36 at this time. The beam may also be folded into four or more sections. However, three sections are preferred, because in this case a middle section of the beam has no fracture. In this way, the beam can be stably fixed onto the vertical rod by using only one fastening component at the middle section.

The base 10 includes a base body 12, a roller 14, a height adjustment member 16 and a pull ring 18.

The base body 12 has a triangular claw shape and includes three claws extending in three different directions. The base body 12 may be made of a metal material.

The roller 14 is mounted to a bottom surface of the base body 12, and there may be three rollers 14. Each of the rollers 14 is mounted to an end of a corresponding one of the claws to facilitate movement of the base body 12. In this embodiment, the roller 14 is an omni-directional moving roller, so that the base body 12 can move toward any direction.

The height adjustment member 16 is mounted to the base body 12 for adjusting a height of the base body 12. In this embodiment, the height adjustment member 16 is an adjustment knob. There are three height adjustment members. There is at least one section of screw rod under the knob. The screw rod is mated with threads of a through hole at the base to implement height adjustment. Each of the height adjustment members 16 is mounted to a corresponding one of the claws and is close to a corresponding one of the rollers 14. The three height adjustment members 16 are distributed in a regular triangle.

The pull ring 18 can be mounted to an upper surface of one of the claws to facilitate pulling of the calibration bracket 100.

It may be understood that, in some other embodiments, a shape of the base body 12 may vary according to an actual requirement, and is not limited to a triangle claw shape. For example, the base body 12 may be a rectangle or a circle. The number of rollers 14 and height adjustment members 16 can be increased or decreased according to actual needs. For example, the triangular-claw-shaped base body 12 may be provided with two height adjustment members and mated with a foot with a fixed height, to adjust the angle of the base body 12.

Figure 4:
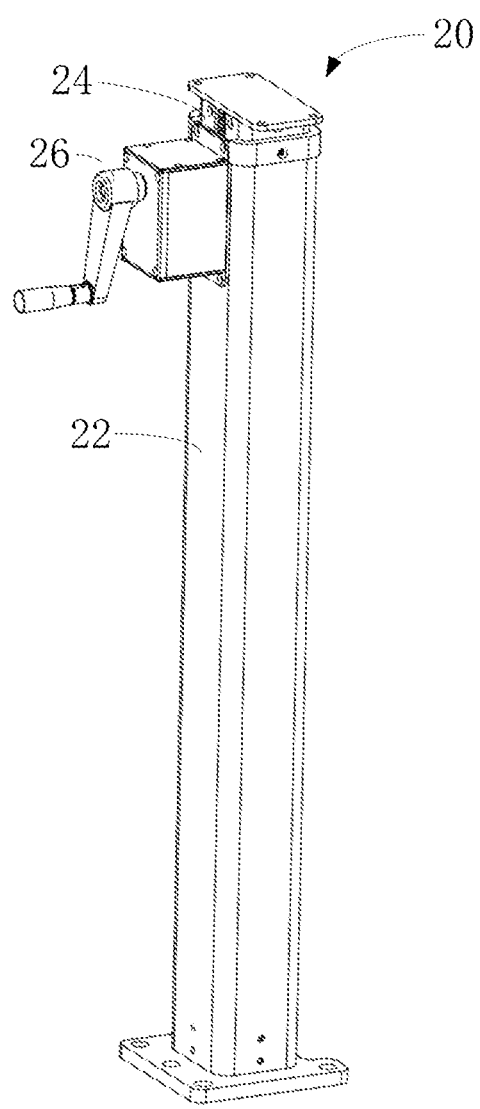
FIG. 4 is a three-dimensional view of a stand assembly of the calibration bracket shown in FIG. 1.
Figure 5:
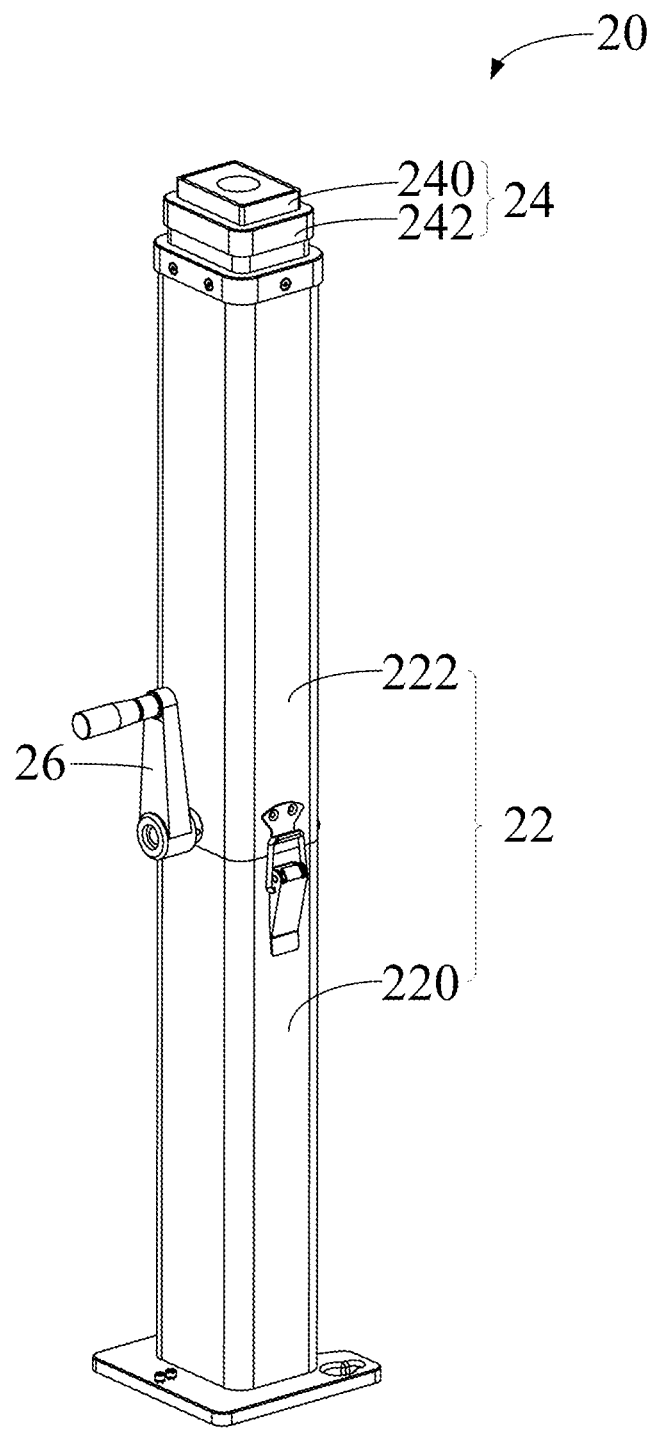
FIG. 5 is a three-dimensional view of a stand assembly according to still other embodiments.

Referring to FIG. 4 and FIG. 5 together, the stand assembly 20 may include a fixed vertical rod 22, a movable vertical rod 24 and a driving mechanism 26. The movable vertical rod 24 is sleeved in the fixed vertical rod 22. The movable vertical rod is movable along a length direction of the fixed vertical rod 22 relative to the fixed vertical rod 22. The driving mechanism 26 is mounted to the fixed vertical rod 22 for driving the movable vertical rod 24 to move along the length direction of the fixed vertical rod 22 relative to the fixed vertical rod 22. By connecting the movable vertical rod 24 and the fixed vertical rod 22 in a sleeving manner, a height of the stand assembly 20 can be reduced to nearly half of an original height. In addition, the cross bar assembly 30 is folded. The stand assembly 20 can be very suitable to be carried in a trunk of a transportation means such as a vehicle.

It may be understood that the fixed vertical rod may also be used as an inner rod and the movable vertical rod as an outer rod as required. The driving mechanism 26 is mounted to the fixed vertical rod 22 and configured to drive the movable vertical rod 24 to move in the length direction of the fixed vertical rod 22 relative to the fixed vertical rod 22.

Optionally, the fixed vertical rod 22 and the movable vertical rod 24 are square tubes. The movable vertical rod 24 is closely sleeved in the fixed vertical rod 22. The movable vertical rod 24 can move only in the length direction of the fixed vertical rod 22 relative to the fixed vertical rod 22. The movable vertical rod 24 can be prevented from moving in other directions relative to the fixed vertical rod 22. This configuration is very important for the calibration bracket 100 to be foldable, because during the calibration, a fixed relative position relationship between components of the calibration bracket 100 is required. For example, a laser may need to be fixed on an outer surface of the fixed vertical rod 22, and a center axis of the vehicle is positioned by using the laser. Therefore, a relative position between a target carried on the support assembly 30 and the vehicle is determined. Therefore, even a slight change in relative positions between the components affects calibration accuracy or requires an additional tuning mechanism for compensation. If the relative positions between the components change greatly, the additional tuning mechanism may fail. Therefore, in the sleeving mode, relative movement, such as relative rotation between the movable vertical rod 24 and the fixed vertical rod 22 other than relative movement in the length direction needs to be eliminated. A simple method is that both the movable vertical rod 24 and the fixed vertical rod 22 are square tubes. The method can ensure that only relative movement in the length direction occurs therebetween.

It may be understood that, in some other embodiments, the fixed vertical rod 22 and the movable vertical rod 24 may also be tubes of other shapes, for example, tubes with mutually matched polygonal cross-sections. The movable vertical rod 24 can move along the length direction of the fixed vertical rod 22 relative to the fixed vertical rod 22. The movable vertical rod 24 can be prevented from moving toward other directions relative to the fixed vertical rod 22. The expression "matching each other" herein does not necessarily require that the cross-sections of the fixed vertical rod 22 and the movable vertical rod 24 need to be the same. For example, the cross-section of the fixed vertical rod 22 disposed outside may be hexagonal. The cross-section of the movable vertical rod 24 disposed inside may be a quadrilateral connected to the hexagon. The movable vertical rod 24 can also be caused to move only in the length direction of the fixed vertical rod 22 relative to the fixed vertical rod 22. The cross-sections of the fixed vertical rod 22 and the movable vertical rod 24 may also be elliptical cylindrical tubes matching each other. The elliptical cross-section can also restrict the relative rotation between the fixed vertical rod and the movable vertical rod to a specific extent.

The fixed vertical rod 22 and the movable vertical rod 24 may also be cylindrical tubes with a circular cross-section. In this case, the fixed vertical rod 22 can be prevented, by using a guide mechanism, from rotating relative to the movable vertical rod 24. The guide mechanism is configured to guide the movable vertical rod 24 to move stably relative to the fixed vertical rod 22. Alternatively, a mechanism for detecting and adjusting the movement of the fixed vertical rod 22 relative to the movable vertical rod 24 in other directions other than the length direction is additionally disposed on other components of the calibration bracket 100. A simple guide mechanism is a guide rail and a slider apparatus matching the guide rail. The guide mechanism may be provided on a surface at which the fixed vertical rod 22 is in contact with the movable vertical rod 24. A guide rail is disposed on one of the fixed vertical rod and the movable vertical rod. A slider apparatus such as a bump, a plastic rubber strip, a roller, a ball, a gear, and the like is disposed on the other. In this case, the slider apparatus is restricted to move on the guide rail. It can also be ensured that only the relative movement in the length direction occurs between the two vertical rods. The guide rail may be a groove, a linear protrusion, a rack, and the like additionally disposed on the tube wall of the vertical rod, or may be a groove, a linear protrusion, a groove formed between two linear protrusions, and the like formed by the tube wall of the vertical rod. In other words, the vertical rod uses a special-shaped tube wall. The tube wall has a part that can be used as the guide rail, such as a groove, a linear protrusion, and the like. Similarly, the slider apparatus may be an additional component that is additionally disposed on the tube wall of the vertical rod. The slider apparatus may alternatively be a protruding structure formed by the tube wall of the vertical rod without a need to dispose additional components on the tube wall of the vertical rod. In addition, a mechanism that achieves transmission through meshing such as a rack also has a guiding effect, and therefore is classified as a type of guide rail in this specification. Transmission mechanisms such as a gear and a rack described in the following embodiments can also achieve a guiding effect. Optionally, the rack may be disposed in the groove guide rail.

It may be understood that positions for disposing the guide rail and the slider apparatus may be transposed. The guide rail may be disposed on the movable vertical rod. The slider apparatus may be disposed on the fixed vertical rod, or the positions for disposing the guide rail and the slider apparatus may be transposed.

It may be understood that the guide mechanism is not limited to being used for the fixed vertical rod 22 and the movable vertical rod 24 with a circular cross-section. The fixed vertical rod 22 and the movable vertical rod 24 with other cross-sectional shapes may also use the guide mechanism to enhance a guiding effect and obtain more stable or less frictional relative movement. For non-circular cross-sectional shapes, the guide rail may also not be used. However, only a linear motion apparatus is used to obtain more stable or less frictional relative movement. In this case, the non-circular external vertical rod plays a guiding role.

Figure 6:
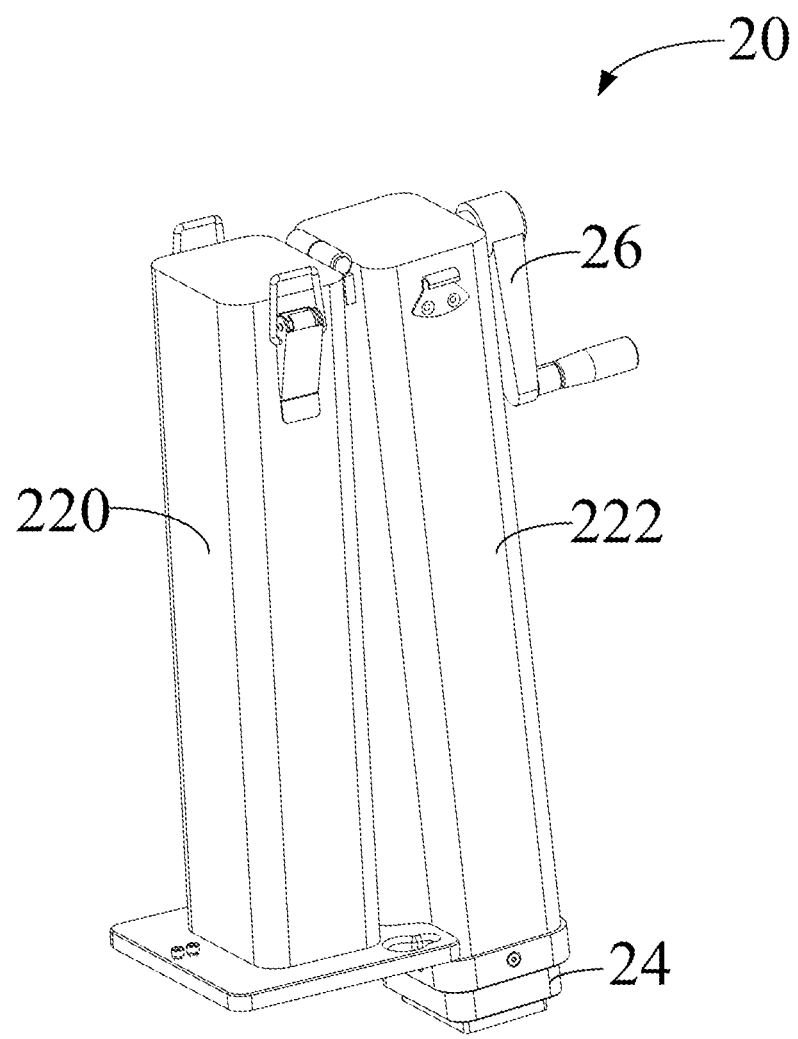
FIG. 6 is a three-dimensional view of the stand assembly shown in FIG. 5 after being folded.
Figure 7:
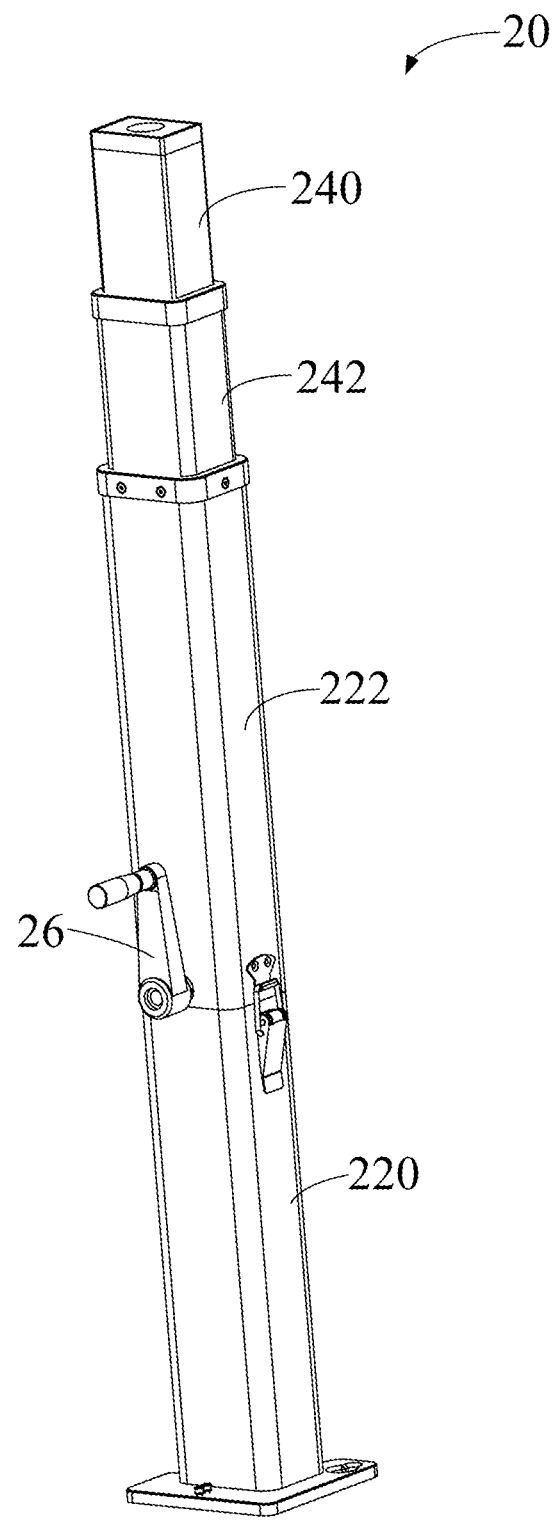
FIG. 7 is a three-dimensional view of the stand assembly shown in FIG. 5 after being extended.
Figure 8:
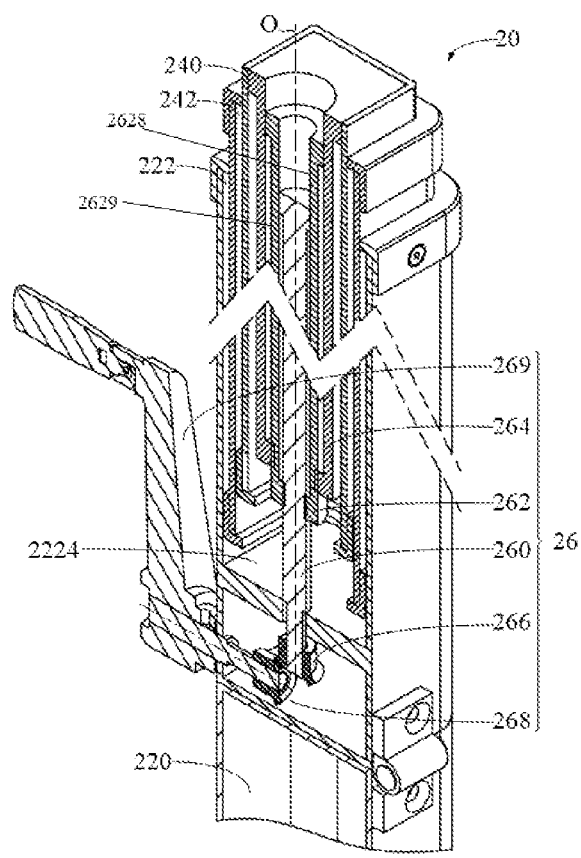
FIG. 8 is a partial cross-sectional view of the stand assembly shown in FIG. 5.
Figure 9:
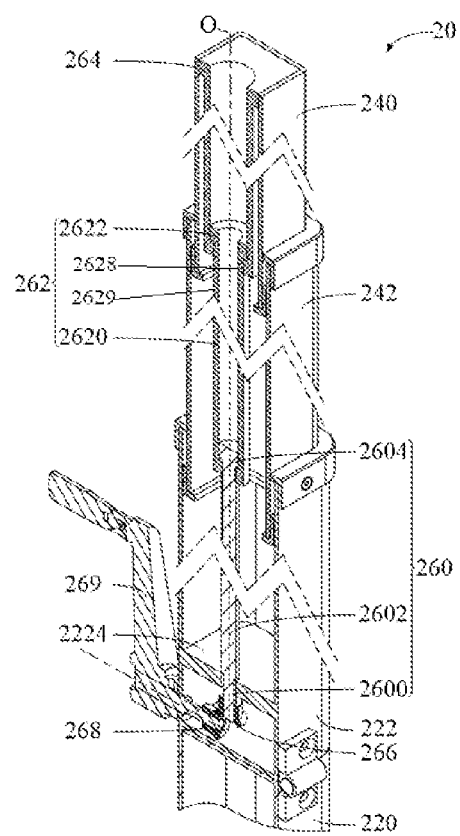
FIG. 9 is a partial cross-sectional view of the stand assembly shown in FIG. 7.
Figure 10:
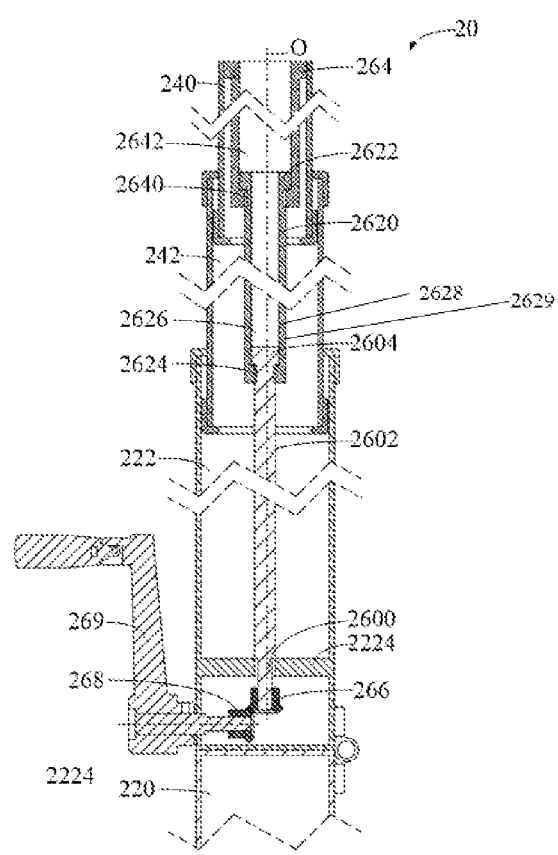
FIG. 10 is a partial cross-sectional view of the stand assembly shown in FIG. 7 from another perspective.

Referring to FIG. 5 to FIG. 7 together, the fixed vertical rod 22 may include a fixed vertical rod body 220 and a foldable vertical rod portion 222. One end of the fixed vertical rod body 220 is fixedly mounted to the base 10. An other end of the fixed vertical rod body 220 is hinged to one end of the foldable vertical rod portion 222. An other end of the foldable vertical rod portion 222 is mounted to the movable vertical rod 24. The movable vertical rod 24 is movable relative to the foldable vertical rod portion 222 in a length direction of the foldable vertical rod portion 222.

In the calibration bracket 100 of this embodiment, the foldable vertical rod portion 222 can pivotally rotate relative to the fixed vertical rod body 220. The support assembly 30 is foldable, thereby reducing a height of the calibration bracket 100 to facilitate transportation.

The movable vertical rod 24 may include an inner rod portion 240 and an outer rod portion 242. The inner rod portion 240 is inserted in the outer rod portion 242. The inner rod portion 240 is movable relative to the outer rod portion 242 in the length direction of the foldable vertical rod portion 222. The outer rod portion 242 is inserted in the foldable vertical rod portion 222. The outer rod portion 242 is movable relative to the foldable vertical rod portion 222 in the length direction of the foldable vertical rod portion 222. The driving mechanism 26 is configured to drive the inner rod portion 240 to move relative to the foldable vertical rod portion 222. The inner rod portion 240 is inserted in the outer rod portion 242. The outer rod portion 242 is inserted in the foldable vertical rod portion 222. The height of the stand assembly 20 can be reduced to nearly one-third of the original height, which improves the portability of the stand assembly 20. In addition, only one driving mechanism 26 can drive both the outer rod portion 242 and the inner rod portion 240 to move relative to the foldable vertical rod portion 222. The weight of the stand assembly 20 is basically not increased.

It may be understood that, on the one hand, according to actual conditions, the outer rod portion 242 may further include a plurality of sleeve rods. One of the plurality of sleeve rods is inserted in the adjacent other.

Figure 11:
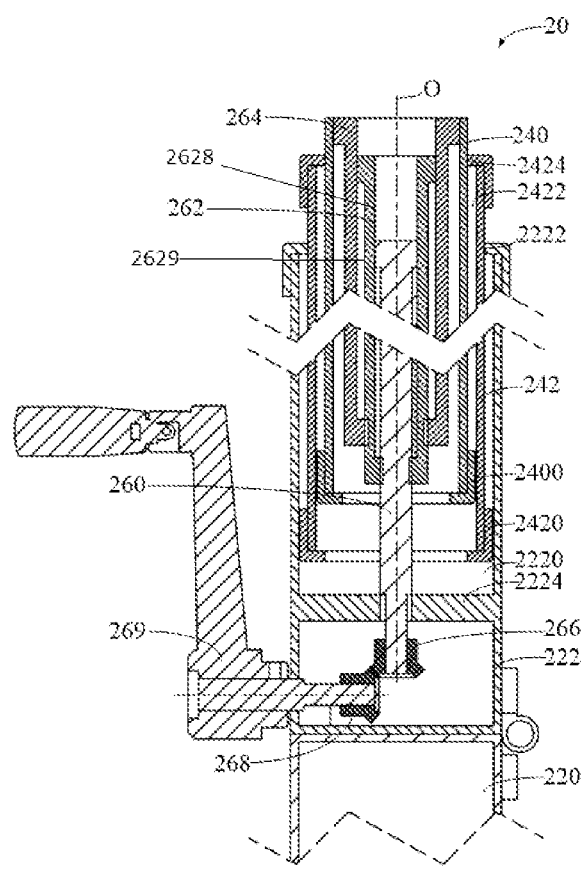
FIG. 11 is a partial cross-sectional view of the stand assembly shown in FIG. 5 from another perspective.

In this embodiment, referring to FIG. 11, the foldable vertical rod portion 222 has a first sliding groove 2220 and a first snap-fit opening 2222. The first snap-fit opening 2222 is in communication with the first sliding groove 2220. A cross-sectional dimension of the first snap-fit opening 2222 is less than a cross-sectional dimension of the first sliding groove 2220. A first stop portion 2420 is provided at an end of the outer rod portion 242. A cross-sectional dimension of the first stop portion 2420 is greater than a cross-sectional dimension of the outer rod portion 242. The first stop portion 2420 is inserted in the first sliding groove 2220. The outer rod portion 242 is inserted in the first snap-fit opening 2222. The first stop portion 2420 abuts against a junction of the first sliding groove 2220 and the first snap-fit opening 2222. The outer rod portion 242 can be prevented from being detached from the foldable vertical rod portion 222.

In this embodiment, referring to FIG. 11 again, the outer rod portion 242 has a second sliding groove 2422 and a second snap-fit opening 2424. The second snap-fit opening 2424 is in communication with the second sliding groove 2422. A cross-sectional dimension of the second snap-fit opening 2424 is less than a cross-sectional dimension of the second sliding groove 2422. The inner rod portion 240 has a second stop portion 2400. A cross-sectional dimension of the second stop portion 2400 is greater than a cross-sectional dimension of the inner rod portion 240. The second stop portion 2400 is inserted in the second sliding groove 2422. The inner rod portion 240 is inserted in the second snap-fit opening 2424. The second stop portion 2400 abuts against a junction of the second sliding groove 2422 and the second snap-fit opening 2424. The inner rod portion 240 can be prevented from being detached from the outer rod portion 242.

Referring to FIG. 8 to FIG. 11 together, the driving mechanism 26 includes a first threaded rotating member 260, a second threaded rotating member 262, a threaded fixed member 264, a first helical gear 266, a second helical gear 268 and a hand wheel 269.

The first threaded rotating member 260 is mounted to the foldable vertical rod portion 222. The first threaded rotating member 260 is rotatable relative to the foldable vertical rod portion 222 only about a central axis O. The central axis O is substantially parallel to the length direction of the foldable vertical rod portion 222.

The second threaded rotating member 262 has a first threaded structure 2628 and a second threaded structure 2629 spiraling about the central axis O. A spiraling direction of the first threaded structure 2628 is the same as a spiraling direction of the second threaded structure 2629. The second threaded rotating member 262 is mounted to the first threaded rotating member 260 through the first threaded structure 2628. The second threaded rotating member 262 is mounted to the threaded fixed member 264 through the second threaded structure 2629. The threaded fixed member 264 is fixedly mounted to the inner rod portion 240.

The first threaded rotating member 260 rotates relative to the foldable vertical rod portion 222. The second threaded rotating member 262 is driven to rotate relative to one of the first threaded rotating member 260 and the threaded fixed member 264. In other words, in one case, when the first threaded rotating member 260 rotates relative to the foldable vertical rod portion 222, the second threaded rotating member 262 is stationary relative to the first threaded rotating member 260. At this point, the threaded fixed member 264 moves relative to the first threaded rotating member 260 and the second threaded rotating member 262. In another case, when the first threaded rotating member 260 rotates relative to the foldable vertical rod portion 222, the second threaded rotating member 262 is stationary relative to the threaded fixed member 264. At this point, both the second threaded rotating member 262 and the threaded fixed member 264 move relative to the first threaded rotating member 260. In actual use, when the first threaded rotating member 260 continuously rotates relative to the foldable vertical rod portion 222, the above two cases may occur alternately. The inner rod portion 240 is driven to move relative to the foldable vertical rod portion 222 through the first threaded rotating member 260, the second threaded rotating member 262 and the threaded fixed member 264. On the one hand, during the movement of the inner rod portion 240 toward the foldable vertical rod portion 222, since the second threaded rotating member 262 also moves toward the foldable vertical rod portion 222, the second threaded rotating member 262 disposed in the rod member will not limit a stroke of the inner rod portion 240 and does not protrude from the inner rod portion 240. The stand assembly 20 is more convenient to carry. On the other hand, since the first threaded rotating member, the second threaded rotating member and the threaded fixed member are all connected by using threads. After the inner rod portion 240 is moved to a designated position relative to the foldable vertical rod portion 222, the driving mechanism 26 can be self-locked.

The first threaded rotating member 260 includes a journal portion 2600, a first screw portion 2602 and a first limiting portion 2604. The first journal portion 2600 is disposed at one end of the first screw portion 2602. The first limiting portion 2604 is disposed on an other end of the first screw portion 2602. A cross-sectional dimension of the first journal portion 2600 is less than a cross-sectional dimension of the first screw portion 2602. The cross-sectional dimension of the first screw portion 2602 is less than a cross-sectional dimension of the first limiting portion 2604.

A mounting separator plate 2224 is provided in the foldable vertical rod portion 222. The mounting separator plate 2224 is substantially horizontal. The journal portion 2600 is inserted in the mounting separator plate 2224. Since the first threaded rotating member 260, the second threaded rotating member 262 and the threaded fixed member 264 are connected by using threads. The first screw portion 2602 abuts against the mounting separator plate 2224. The first threaded rotating member 260 is rotatable relative to the foldable vertical rod portion 222 only about the central axis O. In addition, the mounting separator plate 2224 can limit a position of the second threaded rotating member 260. When the first threaded rotating member 260 rotates to cause the second threaded rotating member 262 to abut against the mounting separator plate 2224, the first threaded rotating member 260 continues to rotate, and the second threaded rotating member 262 remains stationary with respect to the first threaded rotating member 260. The threaded fixed member 264 moves toward the foldable vertical rod portion 222 until the threaded fixed member 264 also abuts against the mounting separator plate 2224. At this point, the first threaded rotating member 260 cannot continue to rotate.

In some other embodiments, the second threaded rotating member 262 is inserted in the first threaded rotating member 260. The first threaded structure 2628 is disposed outside the second threaded rotating member 262.

In this embodiment, the first threaded rotating member 260 is inserted in the second threaded rotating member 262. The first threaded structure is disposed in the second threaded structure 2629.

The second threaded rotating member 262 includes a second screw portion 2620 and a second limiting portion 2622. The second limiting portion 2622 is disposed at an end of the second screw portion 2620. A cross-sectional dimension of the second screw portion 2620 is less than a cross-sectional dimension of the second limiting portion 2622. The second screw portion 2620 has a first screw hole 2624 and a first accommodating groove 2626. The first screw hole 2624 is in communication with the first accommodating groove 2626. In addition, a cross-sectional dimension of the first screw hole 2624 is less than a cross-sectional dimension of the first accommodating groove 2626. The first threaded structure 2628 is disposed on a hole wall of the first screw hole 2624.

In this embodiment, the first threaded rotating member 260 is inserted in the second threaded rotating member 262. The first threaded structure is disposed in the second threaded structure 2629.

The second threaded rotating member 262 includes a second screw portion 2620 and a second limiting portion 2622. The second limiting portion 2622 is disposed at an end of the second screw portion 2620. A cross-sectional dimension of the second screw portion 2620 is less than a cross-sectional dimension of the second limiting portion 2622. The second screw portion 2620 has a first screw hole 2624 and a first accommodating groove 2626. The first screw hole 2624 is in communication with the first accommodating groove 2626. In addition, a cross-sectional dimension of the first screw hole 2624 is less than a cross-sectional dimension of the first accommodating groove 2626. The first threaded structure is disposed on a hole wall of the first screw hole 2624.

The first screw portion 2602 is inserted in the first screw hole 2624. The limiting portion 2604 is accommodated in the first accommodating groove 2626. The first limiting portion 2604 is disposed at an end of the first screw portion 2602. During the rotation of the first threaded rotating member 260, when the second threaded rotating member 262 can move to a position in which the first limiting portion 2604 abuts against a junction of the first screw hole 2624 and the first accommodating groove 2626, the first threaded rotating member 260 continues to rotate, and the second threaded rotating member 262 remains stationary with respect to the first threaded rotating member 260. The threaded fixed member 264 moves away from the foldable vertical rod portion 222.

In some other embodiments, the threaded fixed member 264 is inserted in the second threaded rotating member 262. The second threaded structure 2629 is disposed in the second threaded rotating member 262.

In this embodiment, the second threaded rotating member 262 is inserted in the threaded fixed member 264. The second threaded structure 2629 is disposed outside the second threaded rotating member 262.

The threaded fixed member 264 has a second screw hole 2640 and a second accommodating groove 2642. The second screw hole 2640 is in communication with the second accommodating groove 2642. A cross-sectional dimension of the second screw hole 2640 is less than a cross-sectional dimension of the second accommodating groove 2642. The second threaded structure 2629 is disposed on a hole wall of the second screw hole 2640.

The second screw portion 2620 is inserted in the second screw hole 2640. The second limiting portion 2622 is accommodated in the second accommodating groove 2642. The second limiting portion 2622 is disposed at an end of the second screw portion 2620. During the rotation of the first threaded rotating member 260, when the second threaded rotating member 262 can move to a position in which the second limiting portion 2622 abuts against a junction of the second screw hole 2640 and the second accommodating groove 2642, the first threaded rotating member 260 continues to rotate, and the second threaded rotating member 262 remains stationary with respect to the threaded fixed member 264. The second threaded rotating member 262 and the threaded fixed member 264 together move away from the foldable vertical rod portion 222.

One end of the journal portion 2600 is connected to the first screw portion 2602. The first helical gear 266 is fixedly mounted to an other end of the journal portion 2600. An axis of rotation of the first helical gear 266 overlaps the central axis O. The first helical gear 266 and the first screw portion 260 can rotate together.

The second helical gear 268 is mounted to the foldable vertical rod portion 222. The second helical gear 268 is rotatable relative to the foldable vertical rod portion 222 about its axis of rotation, and an axis of rotation of the second helical gear 268 is perpendicular to the central axis O.

The hand wheel 269 is fixedly mounted to the second helical gear 268. The hand wheel 269 and the second helical gear 268 can rotate together. The first threaded rotating member 260 can be driven to rotate through the hand wheel 269.

Figure 12:
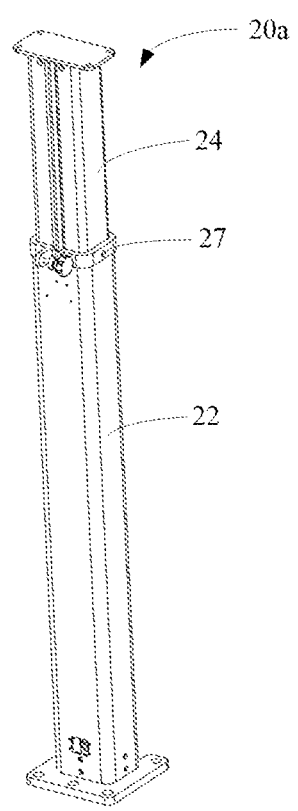
FIG. 12 is a three-dimensional view of a stand assembly according to still other embodiments.
Figure 13:
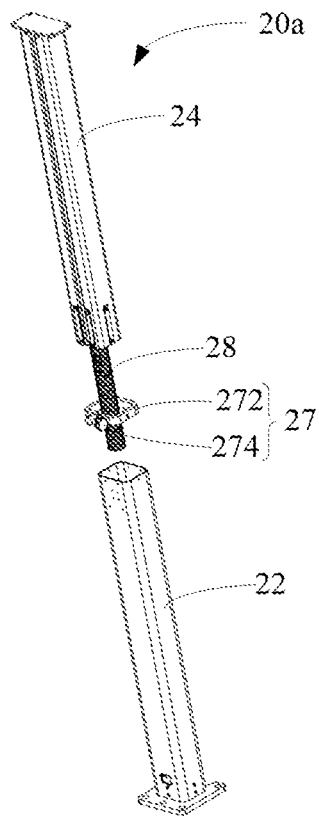
FIG. 13 is an exploded view of the stand assembly shown in FIG. 12.

Referring to FIG. 12 and FIG. 13, in some embodiments, the driving mechanism 26 is omitted. The stand assembly 20 further includes a fastening mechanism 27 and an elastic body 28.

The fastening mechanism 27 may be mounted to one end of the fixed vertical rod 22 and configured to fix the movable vertical rod 24 to the fixed vertical rod 22. The fastening mechanism 27 includes a fastening ring 272 and a bolt 274. The fastening ring 272 is sleeved on the fixed vertical rod 22. The fastening ring 272 may be formed by bending a metal strip. The bolt 274 is mounted to two ends of the fastening ring 272.

The elastic body 28 is located in the fixed vertical rod 22 and the movable vertical rod 24. The elastic body 28 is compressed between the bottom of the fixed vertical rod 22 and the movable vertical rod 24. The elastic body 28 may be connected to the movable vertical rod 24 at a position at the bottom, the top or the middle of the movable vertical rod 24 as required. When the movable vertical rod moves to a position closest to the bottom of the fixed vertical rod, the elastic body is in a compressed state. In this embodiment, the elastic body 28 is a compression spring. It may be understood that, in some other embodiments, the elastic body 28 may be other elastic elements such as an elastic piece, a pneumatic rod, a hydraulic rod, or the like.

When the movable vertical rod 24 needs to be raised relative to the fixed vertical rod 22, the bolt 274 is rotated. The fastening ring 272 loosens the fixed vertical rod 22. An upward force is applied on the movable vertical rod 24. The movable vertical rod 24 can rise in the length direction of the fixed vertical rod 22. By virtue of an elastic force of the elastic body 28, an external force, for example, an external force to be applied by an operator, to be applied on the movable vertical rod 24 can be reduced. When a required position is reached, the bolt 274 is rotated to fasten the fixed vertical rod 22. The movable vertical rod 24 is fixed at the required position. When the movable vertical rod 24 needs to be lowered relative to the fixed vertical rod 22, the bolt 274 is rotated. The fastening ring 272 loosens the fixed vertical rod 22. Under the gravity of the movable vertical rod 24 and the support assembly 30, the movable vertical rod 24 can fall in the length direction of the fixed vertical rod 22. By virtue of the elastic force of the elastic body 28, a falling speed of the movable vertical rod 24 can be reduced. Damage caused by collision on the vertical rod 24 due to an excessively large falling speed of the movable vertical rod 24 can be avoided.

It may be understood that, in some other embodiments, the fastening mechanism 27 may also be other structures, so long as the movable vertical rod 24 can be fixed at a required position. For example, the fastening mechanism 27 may be a screw. The screw passes through the fixed vertical rod 22 to be in screw-thread fit with the fixed vertical rod 22. When the movable vertical rod 24 moves to the required position relative to the fixed vertical rod 22, the screw is rotated to abut against the movable vertical rod 24. The movable vertical rod 24 is fixed at the required position. The screw is rotated to be detached from the movable vertical rod 24. The movable vertical rod 24 can move in the length direction of the fixed vertical rod 22 relative to the fixed vertical rod 22.

Figure 14:
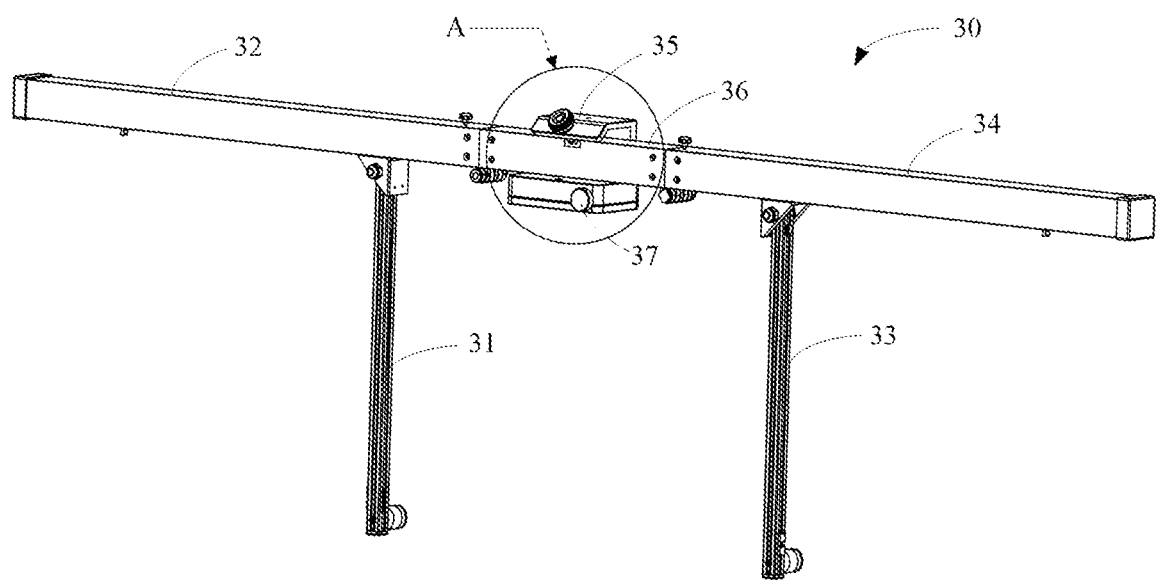
FIG. 14 is a three-dimensional view of a support assembly of the calibration bracket shown in FIG. 1.
Figure 15:
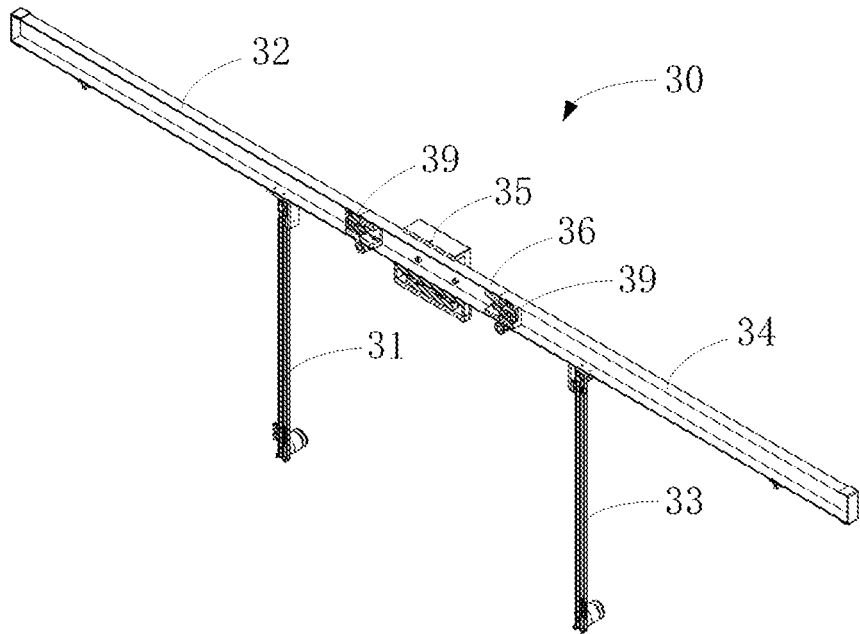
FIG. 15 is a cross-sectional view of the support assembly shown in FIG. 14.
Figure 16:
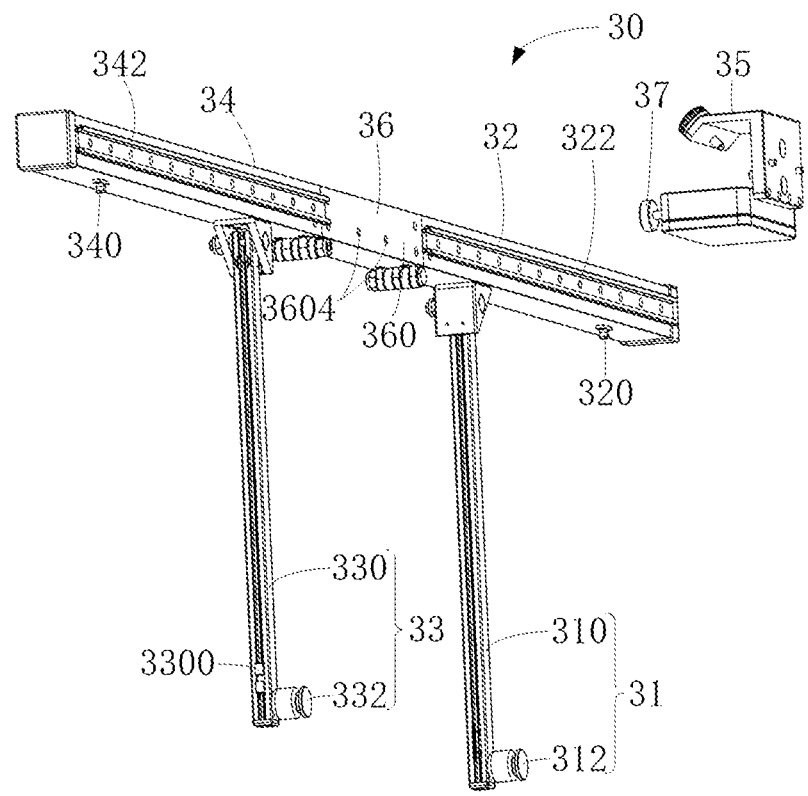
FIG. 16 is an exploded view of the support assembly shown in FIG. 14.

Referring to FIG. 14, FIG. 15 and FIG. 16, the support assembly 30 includes a first supporting rod 31, the first beam portion 32, a second supporting rod 33, the second beam portion 34, a mounting seat 35, the connecting portion 36, an adjustment mechanism 37 and a joint mechanism 39. The first supporting rod 31 and the second supporting rod 33 are configured to support a target to prevent falling, especially when the target has relatively large area and weight.

One end of the first supporting rod 31 can be pivotally connected to the first beam portion 32 through a hinge mechanism, and the like. The first supporting rod 31 can rotate relative to the first beam portion 32 to be unfolded to be perpendicular to the first beam portion 32 and engaged with and parallel to the first beam portion 32.

The first supporting rod 31 includes a first supporting rod body 310 and a first supporting member 312. One end of the first supporting rod body 310 is hinged to the first beam portion 32. The first supporting member 312 is mounted at an other end of the first supporting rod body 310. A side wall of the first supporting rod body 310 is provided with a first slot (not shown).

Similarly, one end of the second supporting rod 33 can be pivotally connected to the second beam portion 34 through a hinge mechanism, and the like. The second supporting rod 33 can rotate relative to the second beam portion 34 to be unfolded to be perpendicular to the second beam portion 34 and engaged with and parallel to the second beam portion 34. The second supporting rod 33 includes a second supporting rod body 330 and a second supporting member 332. One end of the second supporting rod body 330 is hinged to the second beam portion 34. The second supporting member 332 is mounted at an other end of the second supporting rod body 330. A side wall of the second supporting rod body 330 is provided with a second slot 3300. The first supporting member 312 and the second supporting member 332 extend in the same direction. When the first supporting rod 31 is unfolded to be perpendicular to the first beam portion 32, and the second supporting rod 33 is unfolded to be perpendicular to the second beam portion 34, the first slot and the second slot 3300 are arranged oppositely. The first supporting member 312 and the second supporting member 332 can be used to jointly support a calibration element, such as a pattern plate.

The first beam portion 32 is provided with a first fixture block 320 and a first guide rail 322. The first fixture block 320 and the first supporting rod 31 are both connected to the same side of the first beam portion 32. When the first supporting rod 31 is rotated to be parallel to the first beam portion 32, the first fixture block 320 is engaged into the first slot, and the first supporting rod 31 is snapped into the first beam portion 32. The first guide rail 322 is disposed on the other side of the first beam portion 32 and parallel to the first beam portion 32. The first guide rail 322 is configured to mount a widget for mounting the calibration element. For example, the first guide rail is configured to mount a calibration target, a reflector, a laser, and the like. The widget can slide along the first guide rail 322.

Similarly, the second beam portion 34 is provided with a second fixture block 340 and a second guide rail 342. The second fixture block 340 and the second supporting rod 33 are both connected to the same side of the second beam portion 34. When the second supporting rod 33 is rotated to be parallel to the second beam portion 34, the second fixture block 340 is engaged into the second slot 3300, and the second supporting rod 33 is snapped into the second beam portion 34. The second guide rail 342 is disposed on the other side of the second beam portion 34 and parallel to the second beam portion 34. The second guide rail 342 is configured to mount a widget for mounting the calibration element. For example, the second guide rail is configured to mount a reflector, and the like. The widget can slide along the second guide rail 342. The first guide rail 322 and the second guide rail 342 are disposed symmetrically relative to the connecting portion 36, and the first beam portion 32 and the second beam portion 34 are also disposed symmetrically relative to the connecting portion 36. When the base 10 is placed on a horizontal plane, the first guide rail 322, the second guide rail 342, the first beam portion 32 and the second beam portion 34 are all horizontally disposed.

It may be understood that, in some other embodiments, the positions of the first fixture block 320 and the first slot can be interchanged. That is to say, the first fixture block 320 is mounted to the first supporting rod body 310. The first slot is disposed on the first beam portion 32. Similarly, the positions of the second fixture block 340 and the second slot 3300 may also be interchanged. That is to say, the second fixture block 340 is mounted to the second supporting rod body 330. The second slot 3300 is disposed on the second beam portion 34. Optionally, the first slot and the second slot 3300 are recessed in the corresponding beam portions.

It may be understood that, in some other embodiments, the first guide rail 322 and the second guide rail 342 may be disposed on other surfaces, such as the top surface of the beam. In some other embodiments, the first guide rail 322 and the second guide rail 342 do not need to be disposed. The calibration element may be directly hung on the beam by using a hook or the like. The first guide rail 322 and the second guide rail 342 can also have other forms, which are not necessarily shown in the figure. For example, the guide rail can be one or more groove lines arranged on the top surface of the beam. The outer wall of the beam can be used to form the groove line without mounting additional guide rails.

It may be understood that a number of supporting rods is not limited by the foregoing embodiment. For example, there may be only one supporting rod that is disposed at an approximately central position of the connecting portion 36. In this case, the target located at the approximately central position of the support assembly 30 can also be well supported. When the target used for calibration is at other positions, the supporting rod may also be disposed at a corresponding position for supporting. There may be more than two supporting rods. In addition, the supporting rod can also be disposed on a rail. The rail is disposed on a side surface or a bottom surface of the support assembly 30. The supporting rod can move along the assembled support assembly 30, so as to lift, at a suitable position, the targets that may be at different positions.

It may be understood that when the guide rail is used to make the supporting rod movable, the supporting rod can also be snapped onto the support assembly 30 by using a fixture block and a slot.

The connecting portion 36 of the beam is sleeved in the mounting base 35. A first surface 360 of the connecting portion 36 is recessed with positioning holes 3604. Preferably, there are two positioning holes 3604, which are disposed in a length direction of the connecting portion 36.

Figure 17:
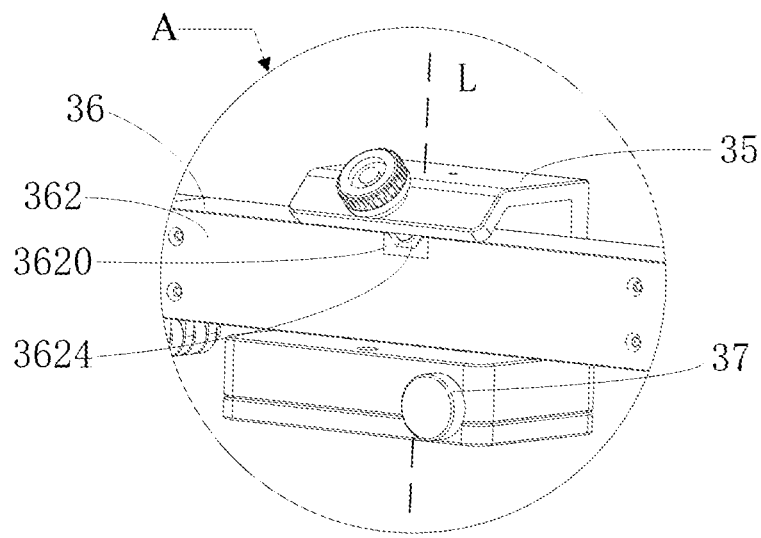
FIG. 17 is a partial enlarged view of a part A in FIG. 14.

Referring to FIG. 17, the connecting portion 36 is provided with a fixing groove 3620. A fixing surface 3624 is disposed in the fixing groove 3620. The fixing groove 3620 is used in conjunction with a fixing rod 354 in FIG. 18 to fix the support assembly onto the mounting base 35. Optionally, the fixing groove 3620 is provided so that the fixing surface 3624 and the bottom surface of the mounting seat 35 are at a certain angle. The advantages of this arrangement are described in combination with the fixing rod in FIG. 18. For example, the fixing groove 3620 may be disposed between a second surface 362 and a top surface of the beam. The second surface 362 is arranged parallel to the first surface 360. An included angle is formed between the fixing surface 3624 and the first surface 360 and the second surface 362. For example, the fixing surface 3624 is disposed at 45 degrees with the first surface 360 and the second surface 362.

In this embodiment, the first beam portion 32, the second beam portion 34 and the connecting portion 36 are all square tubes. Therefore, the weight of the calibration bracket 100 can be reduced, and the connecting portion 36 is easy to be firmly sleeved in the adjustment mechanism 38. It may be understood that, in some other embodiments, the first beam portion 32, the second beam portion 34 and the connecting portion 36 may also be tubes of other shapes, special-shaped materials, rods, or the like. For example, the beam portions and the connecting portion may be polygonal or circular tubes or rods. When the beam is a tube of other shapes, the fixing groove 3620 may be disposed at a position at which a specific angle can be formed between the fixing surface 3624 and the bottom surface of the mounting base 35.

Figure 18:
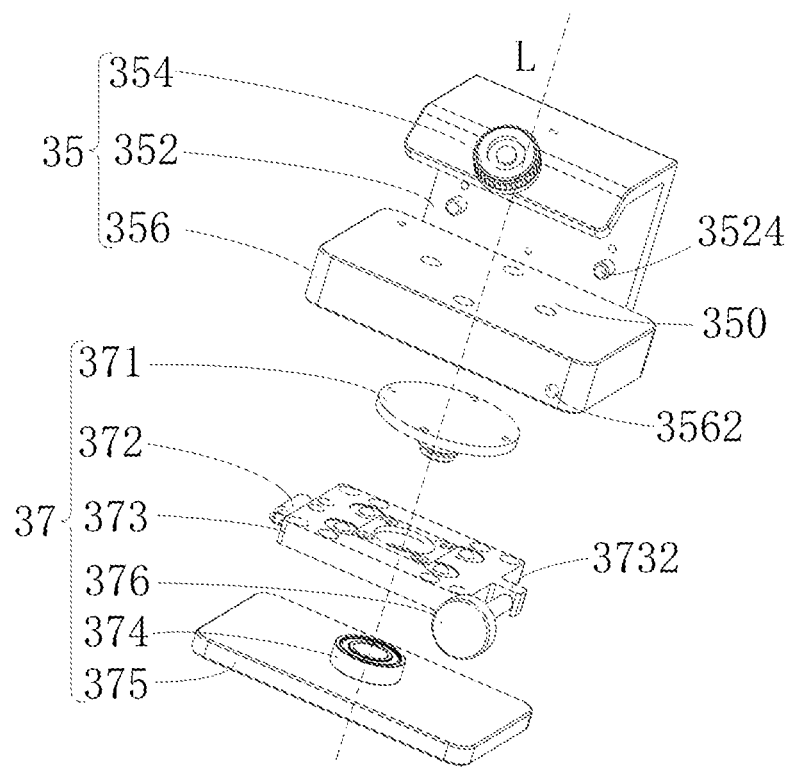
FIG. 18 is an exploded view of an adjustment mechanism of the support assembly shown in FIG. 14.
Figure 19:
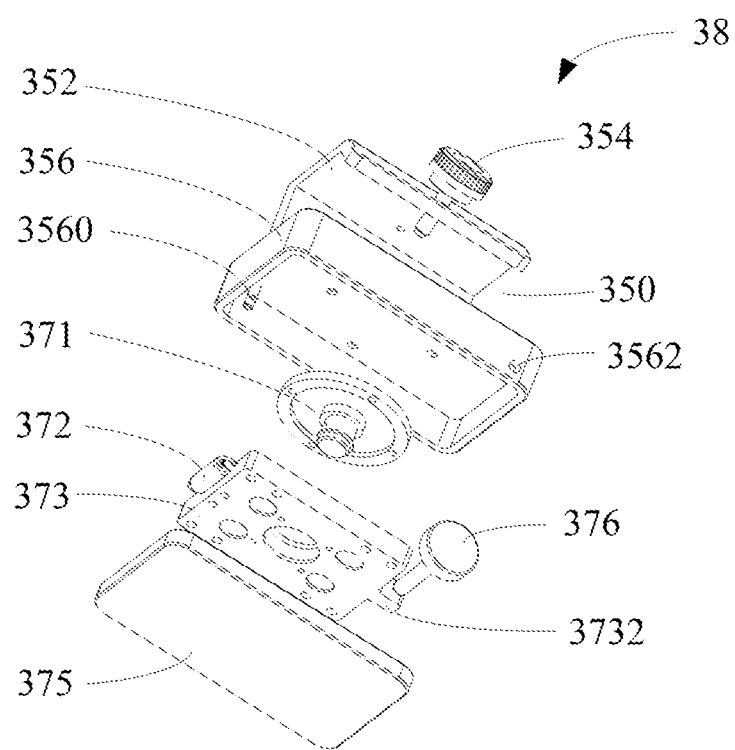
FIG. 19 is an exploded view of the adjustment mechanism shown in FIG. 18 from another perspective.

Referring to FIG. 18 and FIG. 19, the mounting base 35 is configured to sleeve the connecting portion 36. The mounting base 35 includes a holder 352, a fixing rod 354 and a mounting casing 356.

Optionally, the mounting base 35 may be disposed on the adjustment mechanism 37. The mounting base 35 can rotate about an adjustment rotation axis L relative to the stand assembly 20 under adjustment of the adjustment mechanism 37, to adjust the mounting base 35 and the horizontal angle of the support assembly 30. Preferably, the adjustment mechanism 37 is disposed above the mounting base, so as to facilitate removal and mounting of the beam from above while implementing adjustment of the horizontal angle. The adjustment rotation axis L is disposed in parallel to the fixed vertical rod 22 and the movable vertical rod 24. That is to say, when the calibration bracket 100 is placed on a horizontal plane, the adjustment rotation axis L is vertically disposed. The mounting base 35 is provided with a notch 350 for facilitating placement of the connecting portion 36 in the mounting base 35 or removal of the connecting portion 36 from the mounting base 35.

The holder 352 is substantially hook-shaped to facilitate holding of the connecting portion 36. One end of the holder 352 is fixedly connected to the mounting casing 356. For example, the end is mounted on an upper surface or a lateral surface of the mounting casing 356. An other end of the holder surrounds and grasps the connecting portion 36 of a support assembly 20, leaving the notch 350. For example, the holder 352 may have the shape shown in FIG. 18, or may have other shapes, such as a circular hook shape, a hook shape of other polygons, a hook shape with a combination of a circular ring and a polygon, so long as the connecting portion 36 can be stably held. The expression "substantially hook-shaped" herein means that the holder 352 can extend by a specific length at a specific angle, thereby supporting and holding the connecting portion 36.

The holder 352 and the mounting casing 356 form a mounting channel through enclosure for accommodating the connecting portion 36. The mounting channel is in communication with the notch 350. Two positioning columns 3524 are provided on an inner surface of the holder 352. The two positioning columns 3524 are located in the mounting channel and are to be inserted into the two positioning holes 3604 (see FIG. 13), to facilitate positioning of the connecting portion 36 in the mounting channel. The function of the positioning hole is to further reduce any displacement of the support assembly 20 relative to the mounting seat 35 in the horizontal direction during calibration. The positioning column 3524 may also be disposed on the upper surface of the mounting casing 356 or on both the upper surface of the mounting casing 356 and the inner surface of the holder 352. The expression "positioning column" herein includes circular, square, and elongated positioning columns, and the expression "positioning hole" includes circular, square, and elongated positioning holes. When the positioning column and the positioning holes are substantially point-shaped, there are preferably at least two positioning columns 3524 in the length direction of the connecting portion 36, to ensure that the connecting portion 36 does not move in the length direction thereof. When the positioning column and the positioning hole are substantially elongated, only one pair of positioning column and positioning hole may be used. It may be understood that, in some other embodiments, positions of the positioning hole 3604 and the positioning column 3524 may be transposed. That is to say, the positioning hole 3604 is provided on the holder 352 in communication with the mounting channel. The positioning column 3524 is disposed on the first surface 360 (see FIG. 13).

Optionally, the fixing rod 354 is disposed on the holder 352. The fixing rod includes a knob and at least one screw rod and is in screw-thread fit with the holder 352. When the connecting portion 36 is sleeved on the mounting base 35, a central axis of the fixing rod 354 is perpendicular to the fixing surface 3624 at the beam connecting portion 36. By rotating the fixing rod 354, the fixing rod 354 can abut against the fixing surface 3624. The connecting portion 36 of the support assembly 30 can be fixed to the mounting base 35. Alternatively, by rotating the fixing rod 354, the fixing rod 354 can be detached from the fixing surface 3624. The connecting portion 36 can be removed from the mounting base 35 through the notch 350.

Optionally, a specific angle is formed between the fixing surface 3624 and the bottom surface (that is, a horizontal plane) of the mounting base 35 and between the fixing rod 354 and the bottom surface of the mounting base 35. The angle is greater than 0 degrees and less than 90 degrees. Optionally, the angle is substantially 45 degrees. In this arrangement, only one fixing rod 354 needs to be used to apply, to the connecting portion 36, a pressing force toward the bottom surface and a lateral surface of the mounting base. The lateral surface is a side opposite to a direction in which the fixing rod 354 extends. The fixed base fixes the connecting portion 36 with high stability. The support assembly can be easily disassembled and assembled.

It may be understood that the mounting base 35 may have other structures. For example, a notch may not necessarily be maintained. After the connecting portion 36 is placed in the mounting base 35, a baffle or the like can be used to block the notch. The connecting portion 36 can also be mounted in other ways. For example, the mounting base 35 may be a complete ring structure without a notch for placing the beam. In this case, the beam may be assembled first, then the mounting base 35 can be inserted. Then the fixing rod 354 is used to tighten and fix the beam.

It may be understood that the bottom surface or side surface of the mounting seat 35 pressed by the connecting portion 36 may be arc-shaped or other irregular shapes. In this case, the fixing rod 354 may also be used to press the connecting portion 36 on these surfaces. There may be line contact between the fixing rod and these surfaces instead of surface contact, which will not affect the compression effect.

Optionally, when the mounting base 35 includes a notch 350, the surface of the mounting base 35 facing away from the notch 350 may also be used to mount a calibration element, for example, a multi-line laser 200 (see FIG. 1).

The mounting casing 356 is substantially a cube with an opening on one side. The adjustment mechanism 37 is disposed in the opening of the mounting casing 356. The mounting housing 356 is provided with a threaded hole 3562. The adjustment mechanism 37 includes a supporting shaft 371, a first elastic member 372, a rotating member 373, a bearing base 374, a pedestal 375 and an adjusting rod 376. The adjustment mechanism 37 is configured to adjust an angle (that is, a yaw angle) of the support assembly 20 in a horizontal direction.

The supporting shaft 371 is received in the mounting casing 356 and fixedly mounted to the inner wall of the mounting casing 356. A central axis of the supporting shaft 371 overlaps with the adjustment rotation axis L.

One end of the first elastic member 372 is fixed to the mounting column 3560. An other end of the first elastic member 372 is fixed to the rotating member 373. In this embodiment, the first elastic member 372 is a spring.

The rotating member 373 is substantially a cube. One end of the rotating member is provided with a protrusion 3732. The protrusion 3732 and the first elastic member 372 are respectively located on two opposite sides of the rotating member 373. The rotating member 373 is sleeved on the bearing base 374.

The bearing base 374 is fixedly mounted on a surface of the pedestal 375, and a central axis of the bearing base 374 overlaps with the adjustment rotation axis L. The rotating member 373 is fixedly mounted to the pedestal 375 and sleeved on the bearing base 374. One end of the supporting shaft 371 is inserted into the bearing base 374. The supporting shaft 371 and the mounting casing 356 can rotate together about the adjustment rotation axis L relative to the rotating member 373, the bearing base 374 and the pedestal 375.

The pedestal 375 is mounted to the movable vertical rod 24. The movable vertical rod 24 can drive the pedestal 375 to rise or fall. In this embodiment, the pedestal 375 is a cube. The pedestal 375 covers the opening of the mounting casing 356. The supporting shaft 371, the first elastic member 372 and the rotating member 373 are all received in a cavity formed by the mounting casing 356 and the pedestal 375.

The expression "cube" in this specification includes a thin plate shape.

The adjusting rod 376 is mounted in the threaded hole 3562. By rotating the adjusting rod 376, the adjusting rod 376 abuts against the protrusion 3732, and pushes the mounting base 35 to rotate about the adjustment rotation axis L relative to the rotating member 373 and the pedestal 375. Therefore, the mounting base 35 and the horizontal angle of the connecting portion 36 are adjusted. The first elastic member 372 is stretched. The adjusting rod 376 is rotated in an opposite direction. The mounting base 35, rotates, through pulling of the first elastic member 372, about the adjustment rotation axis L relative to the rotating member 373 and the pedestal 375 to return to its original position.

It may be understood that, in some other embodiments, the pedestal 375 may be omitted. The rotating member 373 and the bearing base 374 may be fixedly mounted on the top surface of the movable vertical rod 24 directly.

It may be understood that the foregoing adjustment mechanism 37 may be selectively used. When the adjustment mechanism 37 is cancelled, the mounting casing 356 of the mounting base 35 may be cancelled. The holder 352 is mounted on the top surface of the movable vertical rod 24 or other additional mounting surfaces. It should be understood that the holder 352 may also extend to form a bottom surface and surround the lower surface of the connecting portion 36 of the support assembly 30. That is to say, the holder 352 may have a bottom surface mounted to the mounting casing 356.

Referring to FIG. 12 again, there are two joint mechanisms 39. One of the joint mechanisms 39 is connected between the first beam portion 32 and the connecting portion 36. The other of the joint mechanisms 39 is connected between the second beam portion 34 and the connecting portion 36. In some embodiments, the joint mechanism 39 is fixed in the wall tubes of the first beam portion 32, the second beam portion 34 and the connecting portion 36. In some embodiments, the joint mechanism 39 is fixed outside the wall tubes of the first beam portion 32, the second beam portion 34 and the connecting portion 36. The joint mechanism is connected to cross-sections of the wall tubes of the first beam portion 32, the second beam portion 34 and the connecting portion 36 by snapping, screwing, bonding, and the like.

Figure 20:
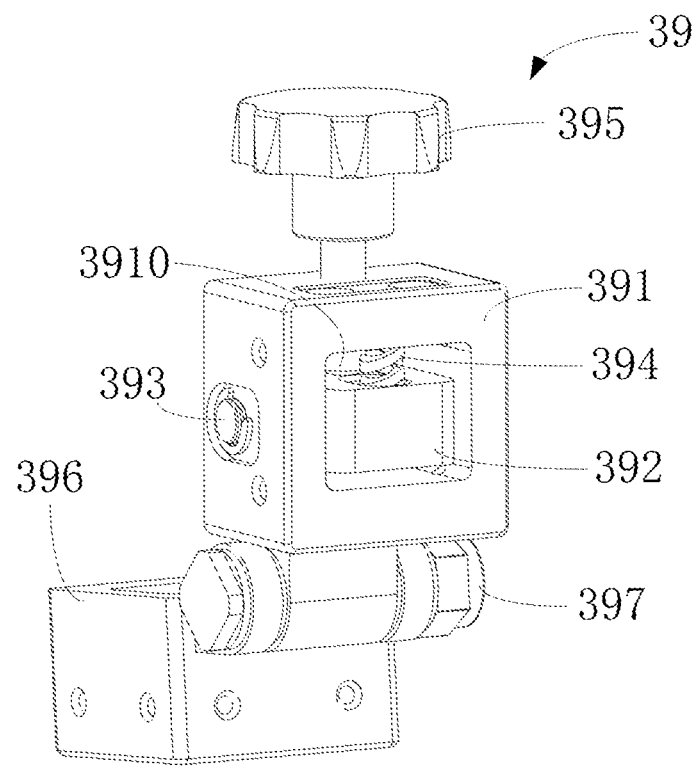
FIG. 20 is a three-dimensional view of a joint mechanism of the support assembly shown in FIG. 14.
Figure 21:
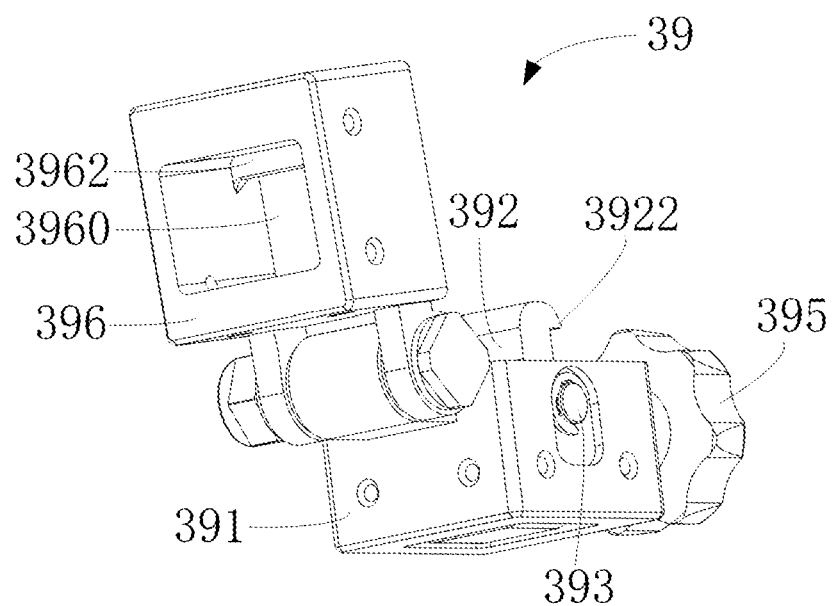
FIG. 21 is a three-dimensional view of the joint mechanism shown in FIG. 20 from another perspective.
Figure 22:
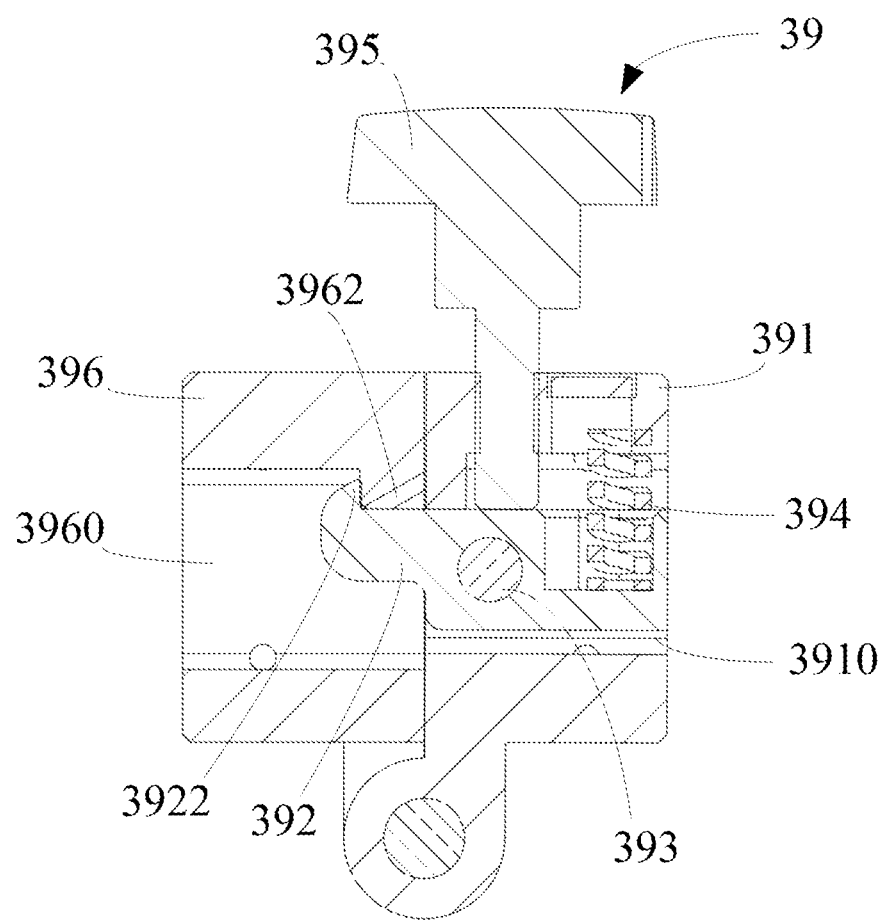
FIG. 22 is a cross-sectional view of the joint mechanism shown in FIG. 20.

FIG. 20, FIG. 21 and FIG. 22 together show a first implementation of a structure of a joint mechanism 39. The joint mechanism 39 includes a first fixing member 391, a second fixing member 396, a first rotating shaft 397, a fastening member 392, a second rotating shaft 393, a second elastic member 394 and a screwing mechanism 395.

The first fixing member 391 and the second fixing member 396 are hinged to each other through the first rotating shaft 397. The first fixing member 391 is substantially a cube. One end of the first fixing member is hinged to one end of the second fixing member 396. The first fixing member 391 is provided with a first through hole 3910.

The fastener 392 is received in the first through hole 3910. The second rotating shaft 393 passes through the middle of the fastener 392. Two ends of the second rotating shaft 393 are respectively mounted to side walls of the first fixing member 391. The fastener 392 can rotate about the second rotating shaft 393. A hook portion 3922 extends from one end of the fastener 392. One end of the second elastic member 394 abuts against an other end of the fastener 392. An other end of the second elastic member 394 abuts against an inner wall of the first fixing member 391. The second elastic member 394 is a compression spring for restoration from elastic deformation, so as to push the fastener 392 to rotate about the second rotating shaft 393.

The screwing mechanism 395 includes a knob and at least one section of screw rod. One end of the screwing mechanism 395 passes through the first fixing member 391 from the outside of the first fixing member 391, and abuts against the fastening member 392. The screwing mechanism 395 and the second elastic member 394 are located on the same side of the central axis of the second rotating shaft 393. The hook portion 3922 is located on the other side of the central axis of the second rotating shaft 393.

The second fixing member 396 is also substantially a cube and provided with a second through hole 3960. An inner wall of the second through hole 3960 is provided with a bulge 3962. The first fixing member 391 is fixed to the inside of the connecting portion 36. The second fixing member 396 is fixed to the inside of the first beam portion 32 or the second beam portion 34. The first beam portion 32 or the second beam portion 34 can be engaged with the connecting portion 36.

When the first fixing member 391 and the second fixing member 396 are fastened, the first fixing member 391 is in contact with the second fixing member 396, and the first through hole 3910 is in communication with the second through hole 3960. Pushed by the second elastic member 394, the hook portion 3922 is fastened to the locking protrusion 3962, and the screwing mechanism 395 is rotated. The screwing mechanism 395 presses the fastening member 392. The hook portion 3922 is further fastened to the locking protrusion 3962. The first beam portion 32 or the second beam portion 34 is stably unfolded relative to the connecting portion 36.

The screwing mechanism 395 is rotated to be disengaged from the fastening member 392. The first fixing member 391 rotates relative to the second fixing member 396. The hook portion 3922 is separated from the locking protrusion 3962. The first fixing member 391 is separated from the second fixing member 396. The first beam portion 32 or the second beam portion 34 can rotate relative to the connecting portion 36. The support assembly 30 is folded.

In this embodiment, pushed by the second elastic member 394, the hook portion 3922 can be easily fastened to the locking protrusion 3962. The hook portion 3922 and the locking protrusion 3962 are fastened to each other in advance. Then the screwing mechanism 395 presses the fastening member 392. The hook portion 3922 is further fastened to the locking protrusion 3962.

It may be understood that, in some other embodiments, positions of the first fixing member 391 and the second fixing member 396 can be interchanged. That is to say, the first fixing member 391 is fixed to the inside of the first beam portion 32 or the second beam portion 34. The second fixing member 396 is fixed to inside of the connecting portion 36.

It may be understood that the first fixing member 391 and the second fixing member 396 may also be integrally formed with inner walls of the first beam portion 32, the second beam portion 34 or the connecting portion 36. That is to say, the first fixing member 391 and the second fixing member 396 may be a part of the inner walls of the first beam portion 32, the second beam portion 34 or the connecting portion 36. The first fixing member 391 and the second fixing member 396 may not be connected by using a first rotating shaft or are not connected. However, the first beam portion 32 or the second beam portion 34 and the outer wall of the connecting portion 36 are connected by using an additional rotating shaft. Therefore, the pivotable connection between the first beam portion 32 or the second beam portion 34 and the connecting portion 36 can also be implemented.

It may be understood that relative positions between the second elastic member 394 and the screwing mechanism 395 and the second rotating shaft 393 may be changed. That is to say, the second elastic member 394 may be closer to the second rotating shaft 393 than the screwing mechanism 395, as long as the fastening member 392 can be fastened to the locking protrusion 3962.

Figure 23:
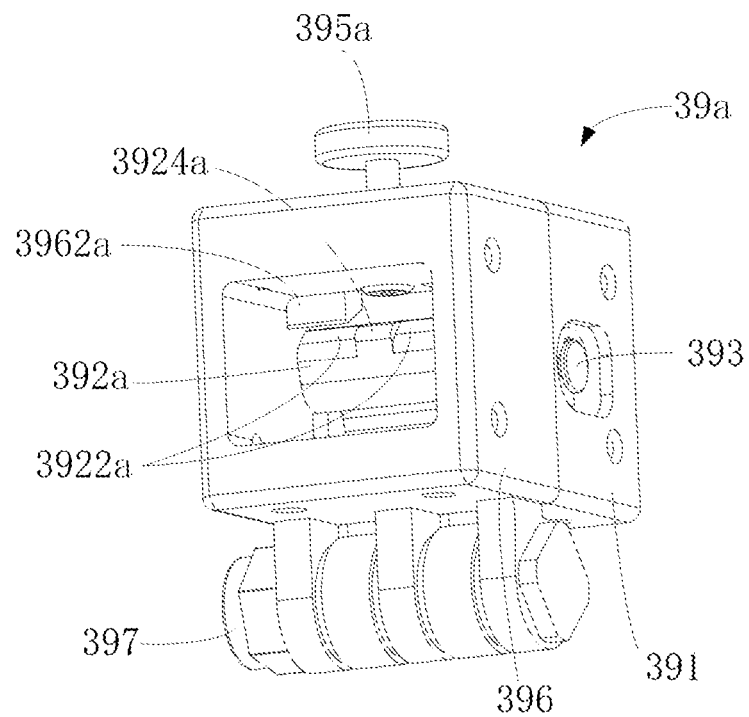
FIG. 23 is a three-dimensional view of a joint mechanism according to some embodiments.
Figure 24:
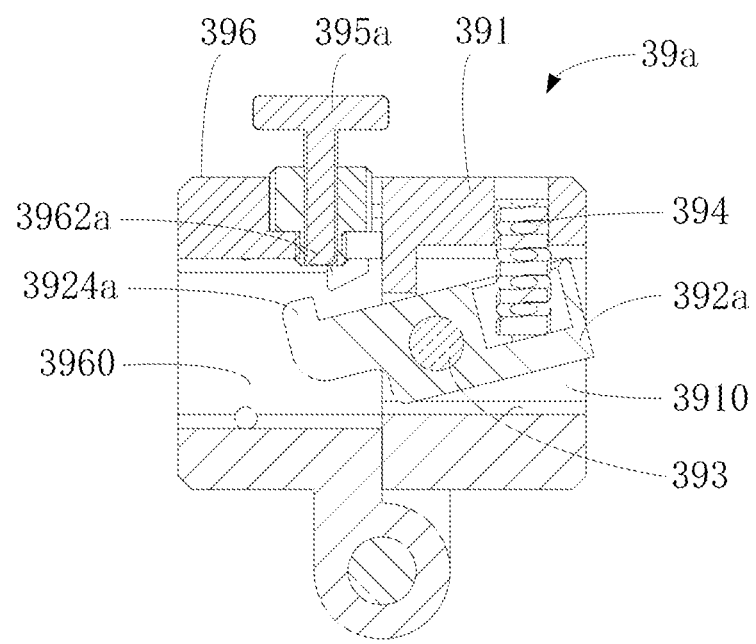
FIG. 24 is a cross-sectional view of the joint mechanism shown in FIG. 23.

Referring to FIG. 23 and FIG. 24 together, a second embodiment of a structure of a joint mechanism 39 is shown. The joint mechanism 39a provided in the second implementation is substantially the same as the joint mechanism 39 in the foregoing embodiment. A difference is that one end of the fastener 392a is provided with a hook portion 3922a and a bump 3924a. Two hook portions 3922a are located on two opposite sides of the bump 3924a. An inner wall of the second through hole 3960 is provided with a bulge 3962a.

There are two bulges 3962a. A position of each of the bulges 3962a corresponds to a position of a corresponding one of the hook portions 3922a. The knob 395 is replaced with a button 395a. The button 395a is mounted to the second fixing member 396. The second elastic member 394 is a compression spring compressed between the first fixing member 391 and the fastener 392a.

When the first fixing member 391 and the second fixing member 396 are closed, the first fixing member 391 is in contact with the second fixing member 396, and the first through hole 3910 is in communication with the second through hole 3960. The second elastic member 394 abuts against the fastener 392a. The two hook portions 3922a are respectively fastened to the two bulges 3962a. The first fixing member 391 and the second fixing member 396 are fastened to each other. The first beam portion 32 or the second beam portion 34 is unfolded relative to the connecting portion 36.

When the button 395a is pressed, and the button 395a pushes the bump 3924a to push the fastening member 392a to rotate around the second rotating shaft 393, the hook portion 3922a is separated from the locking protrusion 3962a, and the second elastic member 394 is further compressed. In this case, the first fixing member 391 can rotate relative to the second fixing member 396. The first fixing member 391 is separated from the second fixing member 396. The first beam portion 32 or the second beam portion 34 can rotate relative to the connecting portion 36, to fold the support assembly 30. The button 395a is loosened to make the button 395a far away from the fastening member 392a. The second elastic member 394 recovers elastic deformation to push the fastening member 392a to rotate around the second rotating shaft 393. The hook portion 3922a is fastened to the locking protrusion 3962a.

Figure 25:
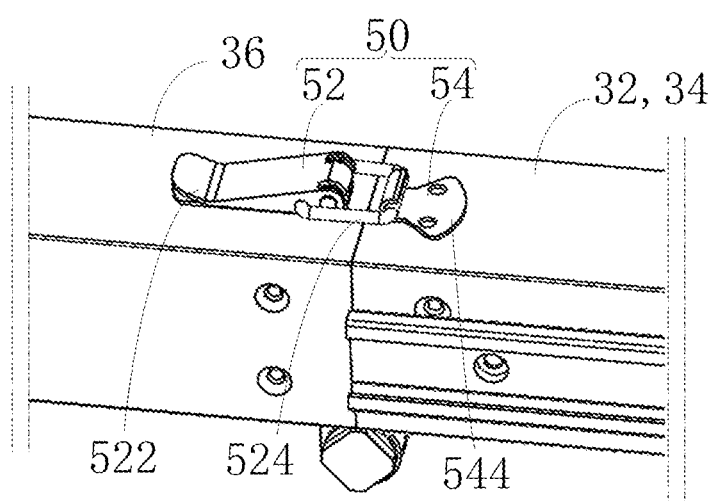
FIG. 25 is a three-dimensional view of a first buckle and a second buckle buckled with each other according to some embodiments.

Referring to FIG. 25, in order to increase the engagement strength of the first beam portion 32 and the second beam portion 34 with the connecting portion 36 respectively, so that the first beam portion 32 and the second beam portion 34 can be mounted with a calibration element with a more weight, the calibration bracket 100 may further include a fastening structure 50. One fastening structure 50 is connected between the first beam portion 32 and the connecting portion 36. The other fastening structure 50 is connected between the second beam portion 34 and the connecting portion 36.

Each of the buckle structures 50 includes a first buckle 52 and a second buckle 54. The connecting portion 36 is provided with a first fastener 52. One end of the first fastener 52 is hinged to the connecting portion 36. One end of the first fastener 52 hinged to the connecting portion 36 is provided with a pulling portion 522. The other end of the first fastener 52 is provided with a hook rod 524. The first beam portion 32 or the second beam portion 34 is provided with a second fastener 54. The second fastener 54 is provided with a fastening portion 544. A hinge joint of the first beam portion 32 or the second beam portion 34 and the connecting portion 36 is located on one side of the connecting portion 36. The first fastener 52 and the second fastener 54 are located on the other side of the connecting portion 36. When the first beam portion 32 and the second beam portion 34 are unfolded relative to the connecting portion 36, the first beam portion 32 and the second beam portion 34 are respectively in contact with the connecting portion 36. The hook rod 524 is fastened to the fastening portion 544. By pulling the pulling portion 522, the hook rod 524 is separated from the fastening portion 544. The first fastener 52 and the second fastener 54 may be separated. The first beam portion 32 or the second beam portion 34 can be folded relative to the connecting portion 36.

It may be understood that, in some other embodiments, positions of the first fastener 52 and the second fastener 54 can be interchanged. That is to say, the first fastener 52 is disposed on the first beam portion 32 or the second beam portion 34. The second fastener 54 is disposed on the connecting portion 36. In some embodiments, the first fastener 52 and the second fastener 54 can be used in conjunction with the joint mechanism 39. That is to say, in this case, the joint mechanism 39 is disposed in inner walls of the first beam portion 32, the second beam portion 34 and the connecting portion 36. In some embodiments, the first fastener 52 and the second fastener 54 can be used alone. That is, in this case, the joint mechanism 39 is not disposed in inner walls of the first beam portion 32, the second beam portion 34 and the connecting portion 36.

Figure 26:
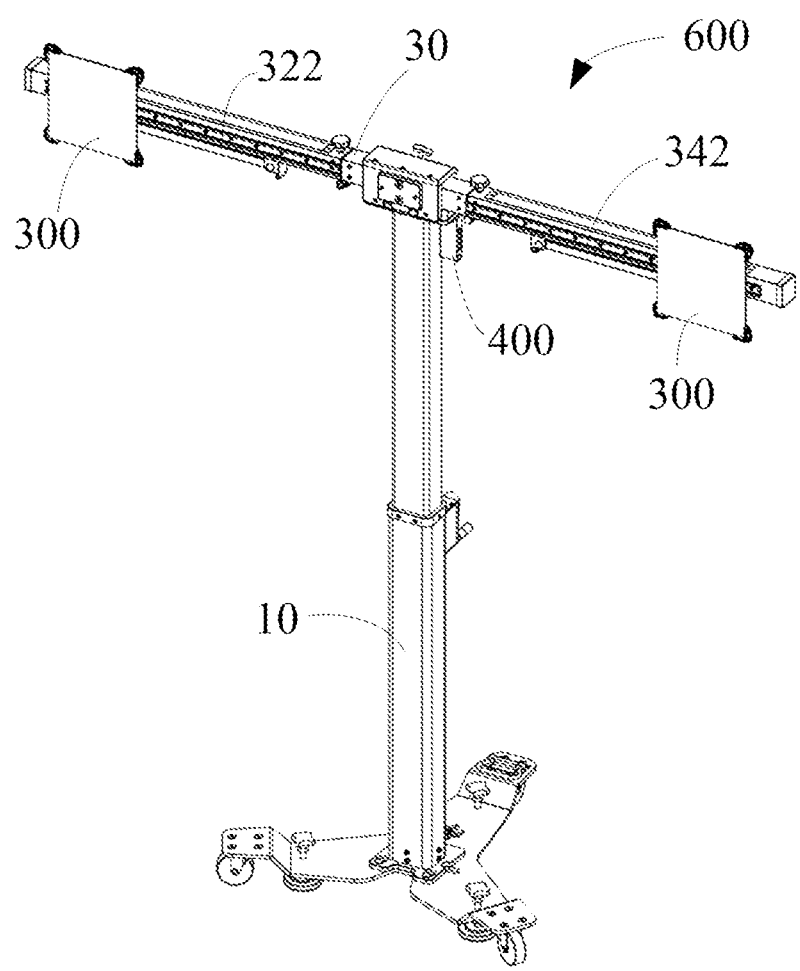
FIG. 26 is a three-dimensional view of a calibration system according to another embodiment, where the calibration system includes a calibration bracket and a calibration element, the calibration element being a reflector hung on the calibration bracket.
Figure 27:
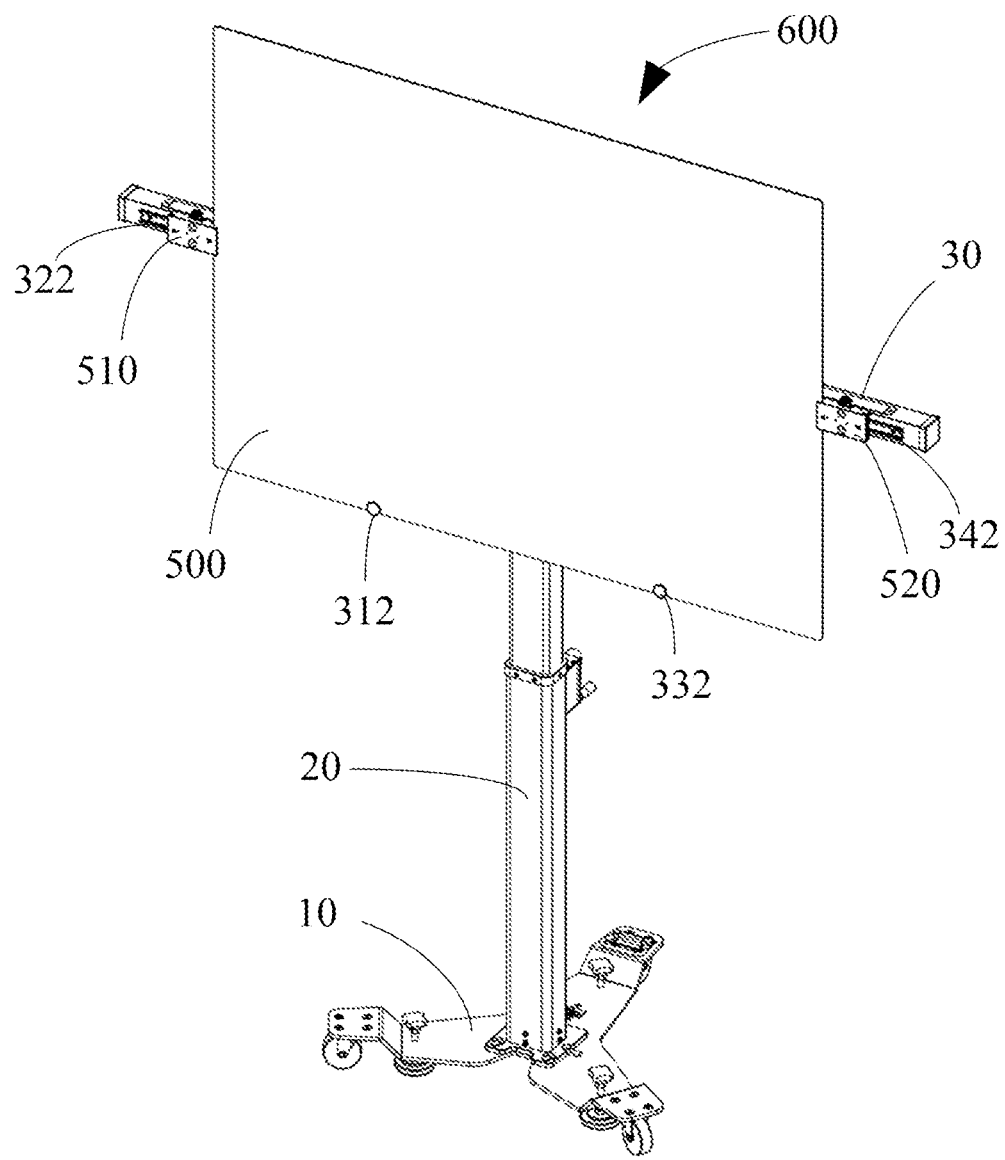
FIG. 27 is a three-dimensional view of a calibration system shown in FIG. 26, where the reflector is replaced with a pattern plate mounted to the calibration bracket.

Referring to FIG. 26 and FIG. 27 together, another embodiment of the disclosure also provides a calibration system 600. The calibration system includes a calibration element and the calibration bracket 100 provided in the foregoing embodiments. The calibration element can be mounted to the calibration bracket 100. For example, the calibration element is a reflector 300 and a distance measurement apparatus 400 (see FIG. 23). The reflector 300 may be mounted on a first guide rail 322 or a second guide rail 342 via a slider. The slider is mounted to the first guide rail 322 or the second guide rail 342, and can slide along the first guide rail 322 or the second guide rail 342 together with the reflector 300. The distance measurement apparatus 400 is fixedly mounted to the support assembly 30. The reflector 300 may also be a target 300. Two targets are mounted on the first guide rail 322 and the second guide rail 342 through the slider. The reflector or the target 300 may be further directly mounted to the support assembly 30 by using a hook, or the like. In this case, the first guide rail 322 and the second guide rail 342 may be cancelled.

The foregoing distance measurement apparatus 400 is configured to measure a height of the support assembly 30 from the ground. The height is preferably displayed on a liquid crystal display screen of the distance measurement apparatus 400. In an embodiment, the distance measurement apparatus 400 is a laser rangefinder. A through hole 120 is disposed on the base 10. A laser of the laser rangefinder 400 aims at the ground to measure the height of the support assembly 30 from the ground.

For another example, the calibration element is a pattern plate 500 (see FIG. 27). The first supporting member 312 and the second supporting member 332 jointly support the pattern plate 500 to prevent falling. In addition, a first fixing block 510 may be further mounted to the first guide rail 322. The first fixing block 510 can slide in the first guide rail 322. A second fixing block 520 is mounted to the second guide rail 342. The second fixing block 520 can slide in the second guide rail 342. The first fixing block 510 and the second fixing block 520 are respectively located on two opposite sides of the pattern plate 500. The first fixing block 510 and the second fixing block 520 collaboratively clamp the pattern plate 500.

In an optional embodiment, the first fixing block 510 and the second fixing block 520 are sliders for mounting the reflector 300. A slot for clamping the pattern plate 500 is provided on opposite sides of the slider, to form a fixing block. It may be understood that the first fixing block 510 and the second fixing block 520 may also be magnetic blocks. The magnetic blocks attract the pattern plate 500 from the back through magnetic absorption, to cause the pattern plate 500 to be more firmly mounted to the support assembly 30.

Finally, it should be noted that the foregoing embodiments are merely used for describing the technical solutions of the disclosure, but are not intended to limit the disclosure. Under the concept of the disclosure, the technical features in the foregoing embodiments or different embodiments may be combined. The steps may be implemented in any sequence. There may be many other changes in different aspects of the disclosure as described above. For brevity, those are not provided in detail. Although the disclosure is described in detail with reference to the foregoing embodiments, those of ordinary skill in the art should understand that they may still make modifications to the technical solutions described in the foregoing embodiments or make equivalent replacements to some technical features thereof, without departing from the scope of the technical solutions of the embodiments of the disclosure.

What is claimed is:

1. A calibration bracket, comprising:
a base;
a stand assembly;
a support assembly, the support assembly being configured to mount a calibration element, wherein the support assembly comprises, a first beam portion, a second beam portion, and a connecting portion, the first beam portion and the second beam portion being rotatable toward each other relative to the connecting portion; and
a distance measurement apparatus fixedly mounted to the support assembly, wherein the distance measurement apparatus aims at the ground to the measure height of the support assembly;
and
the stand assembly comprising:
a fixed vertical rod, one end of the fixed vertical rod being mounted to the base;
a movable vertical rod, mounted to another end of the fixed vertical rod, the movable vertical rod being movable relative to the fixed vertical rod only along a central axis, and the support assembly being mounted to the movable vertical rod; and
a driving mechanism, comprising a first threaded rotating member, a second threaded rotating member and a threaded fixed member, the first threaded rotating member being mounted to the fixed vertical rod and being rotatable relative to the fixed vertical rod about the central axis, the second threaded rotating member having a first threaded structure and a second threaded structure spiraling about the central axis, a spiraling direction of the first threaded structure being the same as a spiraling direction of the second threaded structure, the second threaded rotating member being mounted to the first threaded rotating member through the first threaded structure and being mounted to the threaded fixed member through the second threaded structure, and the threaded fixed member being fixedly mounted to the movable vertical rod.

2. The calibration bracket according to claim 1, wherein the first threaded rotating member is inserted in the second threaded rotating member, and the first threaded structure is disposed in the second threaded rotating member.

3. The calibration bracket according to claim 2, wherein the first threaded rotating member comprises a first screw portion and a first limiting portion, the first limiting portion being disposed at an end of the first screw portion; and the second threaded rotating member has a first screw hole and a first accommodating groove, the first screw hole being in communication with the first accommodating groove, and the first threaded structure being disposed on a hole wall of the first screw hole, and the first screw portion being inserted in the first screw hole, the first limiting portion being accommodated in the first accommodating groove, and a cross-sectional dimension of the first limiting portion being greater than a cross-sectional dimension of the first screw portion.

4. The calibration bracket according to claim 1, wherein the first threaded rotating member is inserted in the second threaded rotating member, and the second threaded structure is disposed outside the first threaded rotating member.

5. The calibration bracket according to claim 1, wherein the second threaded rotating member is inserted in the threaded fixed member, and the second threaded structure is disposed outside the second threaded rotating member.

6. The calibration bracket according to claim 5, wherein the second threaded rotating member comprises a second screw portion and a second limiting portion, the second limiting portion being disposed at an end of the second screw portion; and the threaded fixed member has a second screw hole and a second accommodating groove, the second screw hole being in communication with the second accommodating groove, and the second screw portion being inserted in the second screw hole, the second limiting portion being accommodated in the second accommodating groove, and a cross-sectional dimension of the second limiting portion being greater than a cross-sectional dimension of the second screw portion.

7. The calibration bracket according to claim 1, wherein the second threaded rotating member is disposed in the threaded fixed member, and the second threaded structure is disposed on the exterior of the second threaded rotating member.

8. The calibration bracket according to claim 1, wherein the driving mechanism further comprises a hand wheel configured to drive the first threaded rotating member to rotate.

9. The calibration bracket according to claim 1, wherein the driving mechanism further comprises a first gear and a second gear,
the first gear being fixedly mounted to the first threaded rotating member, and an axis of rotation of the first gear overlapping the central axis,
the second gear being mounted to the fixed vertical rod, the second gear being rotatable relative to the fixed vertical rod about an axis of rotation thereof, and an axis of rotation of the second gear being perpendicular to the central axis, and
the first gear being meshed with the second gear.

10. The calibration bracket according to claim 3, wherein the fixed vertical rod has a mounting separator plate; and
the first threaded rotating member comprises a journal portion, the journal portion being disposed at an end of the first screw portion, and
the journal portion being inserted in the mounting separator plate, and the cross-sectional dimension of the first screw portion being greater than a cross-sectional dimension of the journal portion, so that the first threaded rotating member is rotatable relative to the fixed vertical rod only about the central axis.

11. The calibration bracket according to claim 1, wherein the movable vertical rod is inserted in the fixed vertical rod, so that the movable vertical rod is movable relative to the fixed vertical rod along the central axis.

12. The calibration bracket according to claim 11, wherein cross-sections of both the movable vertical rod and the fixed vertical rod are non-circular.

13. The calibration bracket according to claim 11, wherein the movable vertical rod comprises an inner rod portion and an outer rod portion,
the inner rod portion being inserted in the outer rod portion, and the outer rod portion being inserted in the fixed vertical rod, and
the threaded fixed member being fixedly mounted to the inner rod portion.

14. The calibration bracket according to claim 13, wherein the outer rod portion has a second sliding groove and a second opening, the second sliding groove being in communication with the second opening; and
the inner rod portion has a second stop portion, a cross-sectional dimension of the inner rod portion being less than a cross-sectional dimension of the second stop portion, and
the second stop portion being inserted in the second sliding groove, and the inner rod portion being inserted in the second opening.

15. The calibration bracket according to claim 1, wherein the fixed vertical rod comprises a fixed vertical rod body and a foldable vertical rod portion,
one end of the fixed vertical rod body being mounted to the base, another end of the fixed vertical rod body being mounted to the foldable vertical rod portion, and the foldable vertical rod portion being pivotably rotatable relative to the fixed vertical rod body,
the movable vertical rod being mounted to the foldable vertical rod portion and being movable relative to the foldable vertical rod portion along the central axis, and
the first threaded rotating member being mounted to the foldable vertical rod portion and being rotatable relative to the foldable vertical rod portion only about the central axis.

16. The calibration bracket according to claim 1, wherein the fixed vertical rod has a first sliding groove and a first opening, the first sliding groove being in communication with the first opening; and
the movable vertical rod has a first stop portion, a cross-sectional dimension of the movable vertical rod being less than a cross-sectional dimension of the first stop portion, and
the first stop portion being inserted in the first sliding groove, and the movable vertical rod being inserted in the first opening.

17. The calibration bracket according to claim 1, wherein the support assembly is mounted to a top of the movable vertical rod.

18. A calibration system, comprising a calibration element and a calibration bracket, the calibration element being configured to be hung on the calibration bracket;
the calibration bracket comprising a base, a stand assembly and a support assembly, the support assembly being configured to mount the calibration element, wherein the support assembly comprises a first beam portion, a second beam portion and a connecting portion, the first beam portion and the second beam portion being rotatable toward each other relative to the connecting portion; a distance measurement apparatus fixedly mounted to the support assembly, wherein the distance measurement apparatus aims at the ground to the measure height of the support assembly;
and
the stand assembly comprising:
a fixed vertical rod, one end of the fixed vertical rod being mounted to the base;
a movable vertical rod, mounted to another end of the fixed vertical rod, the movable vertical rod being movable relative to the fixed vertical rod only along a central axis, and the support assembly being mounted to the movable vertical rod; and
a driving mechanism, comprising a first threaded rotating member, a second threaded rotating member and a threaded fixed member, the first threaded rotating member being mounted to the fixed vertical rod and being rotatable relative to the fixed vertical rod about the central axis, the second threaded rotating member having a first threaded structure and a second threaded structure spiraling about the central axis, a spiraling direction of the first threaded structure being the same as a spiraling direction of the second threaded structure, the second threaded rotating member being mounted to the first threaded rotating member through the first threaded structure and being mounted to the threaded fixed member through the second threaded structure, and the threaded fixed member being fixedly mounted to the movable vertical rod.

19. The calibration system according to claim 18, wherein the first threaded rotating member is inserted in the second threaded rotating member, and the first threaded structure is disposed in the second threaded rotating member.

20. The calibration system according to claim 19, wherein the first threaded rotating member comprises a first screw portion and a first limiting portion, the first limiting portion being disposed at an end of the first screw portion; and
the second threaded rotating member has a first screw hole and a first accommodating groove, the first screw hole being in communication with the first accommodating groove, and the first threaded structure being disposed on a hole wall of the first screw hole, and
the first screw portion being inserted in the first screw hole, the first limiting portion being accommodated in the first accommodating groove, and a cross-sectional dimension of the first limiting portion being greater than a cross-sectional dimension of the first screw portion.

* * * * *